(12) United States Patent
Nakaya

(10) Patent No.: US 12,145,677 B2
(45) Date of Patent: Nov. 19, 2024

(54) LINEAR-MOTION DAMPER AND STEERING DEVICE

(71) Applicant: SOMIC MANAGEMENT HOLDINGS INC., Tokyo (JP)

(72) Inventor: Kazumasa Nakaya, Shizuoka (JP)

(73) Assignee: SOMIC MANAGEMENT HOLDINGS INC., Tokyo (JP)

( * ) Notice: Subject to any disclaimer, the term of this patent is extended or adjusted under 35 U.S.C. 154(b) by 0 days.

(21) Appl. No.: 17/998,817

(22) PCT Filed: Apr. 22, 2021

(86) PCT No.: PCT/JP2021/016341
§ 371 (c)(1),
(2) Date: Nov. 15, 2022

(87) PCT Pub. No.: WO2021/246082
PCT Pub. Date: Dec. 9, 2021

(65) Prior Publication Data
US 2023/0242178 A1    Aug. 3, 2023

(30) Foreign Application Priority Data

Jun. 2, 2020   (JP) ................................ 2020-096430
Jul. 21, 2020  (JP) ................................ 2020-124185

(51) Int. Cl.
  B62D 7/22   (2006.01)
  B62D 3/12   (2006.01)
  (Continued)

(52) U.S. Cl.
  CPC .............. B62D 7/22 (2013.01); B62D 3/12 (2013.01); F16F 9/22 (2013.01); F16F 15/023 (2013.01)

(58) Field of Classification Search
  CPC .. B62D 7/22; B62D 3/12; B62D 7/228; F16F 9/22; F16F 15/023; F16F 9/26
  See application file for complete search history.

(56) References Cited

U.S. PATENT DOCUMENTS 5,157,987 A * 10/1992 Satoh .................... G05G 25/00
                                                    74/581
2021/0178850 A1 * 6/2021 Kaldas ...................... F16F 9/22
(Continued)

FOREIGN PATENT DOCUMENTS

EP    1505315 A2 * 2/2005 ............. F16F 9/061
FR    3048944 A1   9/2017
(Continued)

OTHER PUBLICATIONS

JP2003063418 translation (Year: 2003).*
(Continued)

Primary Examiner — Paul N Dickson
Assistant Examiner — Shams Dhanani
(74) Attorney, Agent, or Firm — Pearne & Gordon LLP

(57) ABSTRACT

Provided are: a linear-motion damper which can avoid an increase in the size of a device configuration of an attachment target and broaden the type of attachment target to which the linear-motion damper is attachable; and a steering device including the linear-motion damper. A steering device (100) includes a linear-motion damper (120) between a rack bar (103) and a rack end (106). In the linear-motion damper (120), an inner chamber (121) is formed between an inner chamber forming body (130) and a socket main body (107) therein. The socket main body (107) is a shaft-shaped component forming the rack end (106) in the steering device (100). The socket main body (107) is slidably fitted in the inner chamber forming body (130). The inner chamber forming body (130) is formed in a tubular shape, and at an inner peripheral portion thereof, is formed with a circular (Continued)

ring-shaped flow control valve (140). The flow control valve (140) includes a first flow control valve (150), a second flow control valve (160), and a third flow control valve (170).

9 Claims, 16 Drawing Sheets

(51) Int. Cl.
*F16F 9/22* (2006.01)
*F16F 15/023* (2006.01)

(56) References Cited

U.S. PATENT DOCUMENTS

| | | | | |
|---|---|---|---|---|
| 2022/0177025 | A1* | 6/2022 | Nakada | B62D 5/0421 |
| 2022/0213946 | A1* | 7/2022 | Kontny | F16F 9/49 |
| 2022/0281279 | A1* | 9/2022 | Yamazaki | B60G 17/0157 |
| 2023/0234633 | A1* | 7/2023 | Nakaya | B62D 3/12 |
| | | | | 74/422 |
| 2023/0242178 | A1* | 8/2023 | Nakaya | B62D 3/12 |
| | | | | 280/90 |

FOREIGN PATENT DOCUMENTS

| | | |
|---|---|---|
| JP | S58-041664 U | 3/1983 |
| JP | S62-170382 U | 10/1987 |
| JP | H07-238970 A | 9/1995 |
| JP | 2003-063418 A | 3/2003 |
| JP | 2005-054942 A | 3/2005 |

OTHER PUBLICATIONS

JP2005054942 translation (Year: 2005).*
International Search Report mailed on Jul. 20, 2021 for PCT/JP2021/016341.
Extended European Search Report issued on May 31, 2024 for the corresponding European Patent Application No. 21817748.3.

* cited by examiner

LINEAR-MOTION DAMPER AND STEERING DEVICE

TECHNICAL FIELD

The present invention relates to a linear-motion damper that damps kinetic energy in linear motion and a steering device including the linear-motion damper.

BACKGROUND ART

Typically, there has been a linear-motion damper that damps kinetic energy in linear motion. For example, in a linear-motion damper disclosed in Patent Literature 1 below, a piston rod reciprocates in a linear direction in a tubular cylinder tube in which fluid oil is sealed.

CITATION LIST

Patent Literature

PATENT LITERATURE 1: JP-A-7-238970

SUMMARY OF INVENTION

However, the linear-motion damper disclosed in Patent Literature 1 above is attached to a tip end portion of the component reciprocating in the linear direction in an attachment target, and for this reason, there are problems that the device configuration of the attachment target is large (mainly, long) and the attachment target to which the linear-motion damper is attachable is limited.

The present invention has been made in order to cope with the above-described problems. An object of the present invention is to provide a linear-motion damper configured so that an increase in the size (mainly, the length) of a device configuration of an attachment target can be avoided and the type of attachment target to which the linear-motion damper is attachable can be broadened and a steering device including the linear-motion damper.

In order to achieve the above-described object, a feature of the present invention is a linear-motion damper including an inner chamber forming body having an inner chamber in which fluid is housed in a liquid-tight manner and damping external force received by the fluid by limiting a flow of the fluid, the linear-motion damper including: a relative displacement body that displaces relative to the inner chamber forming body; and a flow control valve provided at least at one of the inner chamber forming body or the relative displacement body to cause the fluid to flow with a limitation on the flow of the fluid. In the linear-motion damper, the inner chamber forming body is formed in a tubular shape, and the inner chamber is formed inside a tubular portion of the inner chamber forming body, and the relative displacement body penetrates the inner chamber forming body, and is slidably fitted in the inner chamber forming body.

According to the feature of the present invention configured as described above, in the linear-motion damper, the relative displacement body is provided with penetrating the inner chamber forming body formed in the tubular body. Thus, the linear-motion damper can be provided not on an axis direction of a portion, which extends in a shaft shape, of an attachment target of the linear-motion damper, but outside such a portion. Consequently, an increase in the size (mainly, the length) of the device configuration of the attachment target can be avoided, and the type of attachment target to which the linear-motion damper is attachable can be broadened.

Further, another feature of the present invention is the linear-motion damper further including: a return elastic body that provides elastic force at least to one of the inner chamber forming body or the relative displacement body such that the flow control valve is arranged on an external force acting side with respect to the linear-motion damper.

According to another feature of the present invention configured as described above, in the linear-motion damper, the return elastic body provides the elastic force to one of the inner chamber forming body or the relative displacement body such that the flow control valve is elastically displaced to one end side in a relative displacement area. Thus, in the linear-motion damper according to the present invention, in a case where no external force displacing the inner chamber forming body and the relative displacement body relative to each other acts, the relative displacement body is constantly positioned on one end side in the relative displacement region, i.e., an activation start position for producing a damping function of the flow control valve, so that the stroke of the relative displacement body can be maximized.

Further, still another feature of the present invention is the linear-motion damper in which the relative displacement body is formed in a tubular shape.

According to still another feature of the present invention configured as described above, in the linear-motion damper, the relative displacement body is formed in the tubular shape. Thus, the linear-motion damper can be provided in a state in which the portion, which extends in the shaft shape, of the attachment target of the linear-motion damper penetrates the relative displacement body, and therefore, an increase in the size (mainly, the length) of the device configuration of the attachment target can be avoided and the type of attachment target to which the linear-motion damper is attachable can be broadened.

Further, still another feature of the present invention is the linear-motion damper in which the flow control valve is provided at least at the inner chamber forming body.

According to still another feature of the present invention configured as described above, in the linear-motion damper, the flow control valve is provided at least at the inner chamber forming body. Thus, the configuration of the relative displacement body can be simplified.

Further, still another feature of the present invention is the linear-motion damper in which the flow control valve is provided at least at the relative displacement body.

According to still another feature of the present invention configured as described above, in the linear-motion damper, the flow control valve is provided at least at the relative displacement body. Thus, the configuration of the inner chamber forming body can be simplified. Further, the flow control valve is provided at an outer peripheral portion of the relative displacement body, and therefore, maintenance can be easily performed by detachment of the relative displacement body from the inner chamber forming body.

Further, still another feature of the present invention is the linear-motion damper in which the flow control valve is provided at least outside the inner chamber.

According to still another feature of the present invention configured as described above, in the linear-motion damper, the flow control valve is provided at least outside the inner chamber. Thus, a great capacity of the inner chamber can be ensured, and maintenance of the flow control valve can be improved.

The present invention can be implemented not only as the invention relating to the linear-motion damper, but also as the invention relating to a steering device including the linear-motion damper.

Specifically, a steering device includes a steering shaft formed so as to extend in a bar shape and rotated by operation of a steering wheel, a rack bar formed so as to extend in a rod shape and converting rotary motion of the steering shaft into reciprocating motion in an axis direction to transmit the reciprocating motion, an intermediate coupling body coupled to each end portion of the rack bar to directly or indirectly couple a wheel targeted for steering to the each end portion, and a rack housing covering the rack bar. The steering device includes the linear-motion damper according to any one of claims 1 to 6, and the linear-motion damper is provided between the rack housing and the rack bar or the intermediate coupling body to absorb impact from the wheel. According to this configuration, features and advantageous effects similar to those of the above-described linear-motion damper can be expected from the steering device according to the present invention.

In this case, in the steering device, the relative displacement body is formed at the intermediate coupling body, and the inner chamber forming body is formed at such a position that the inner chamber forming body contacts or separates from the rack housing by the reciprocating motion of the rack bar.

According to this configuration, in the steering device according to the present invention, the relative displacement body is formed at a rack end movably connecting a tie rod to the rack bar. Further, the inner chamber forming body is formed at such a position that the inner chamber forming body contacts or separates from the rack housing by the reciprocating motion of the rack bar, and the linear-motion damper is provided at the intermediate coupling body such as the tie rod or the rack end. Thus, linear-motion damper maintenance or replacement can be easily performed.

Further, in this case, in the steering device, the inner chamber forming body is formed at an end portion of the rack housing, and the rack bar or the intermediate coupling body penetrates the relative displacement body, and the relative displacement body is formed at such a position that the rack bar or the intermediate coupling body contacts or separates from the relative displacement body by the reciprocating motion of the rack bar.

According to this configuration, in the steering device according to the present invention, the inner chamber forming body is formed at the end portion of the rack housing, the rack bar or the intermediate coupling body (e.g., the tie rod or the rack end) penetrates the relative displacement body, and the relative displacement body is formed such that the rack bar or the tie rod contacts or separates from the relative displacement body by the reciprocating motion of the rack bar. Thus, in the steering device according to the present invention, the linear-motion damper is provided at the rack housing so that the tie rod or the intermediate coupling body (e.g., the tie rod or the rack end) can be decreased in weight.

DESCRIPTION OF EMBODIMENTS

First Embodiment

Figure 1:
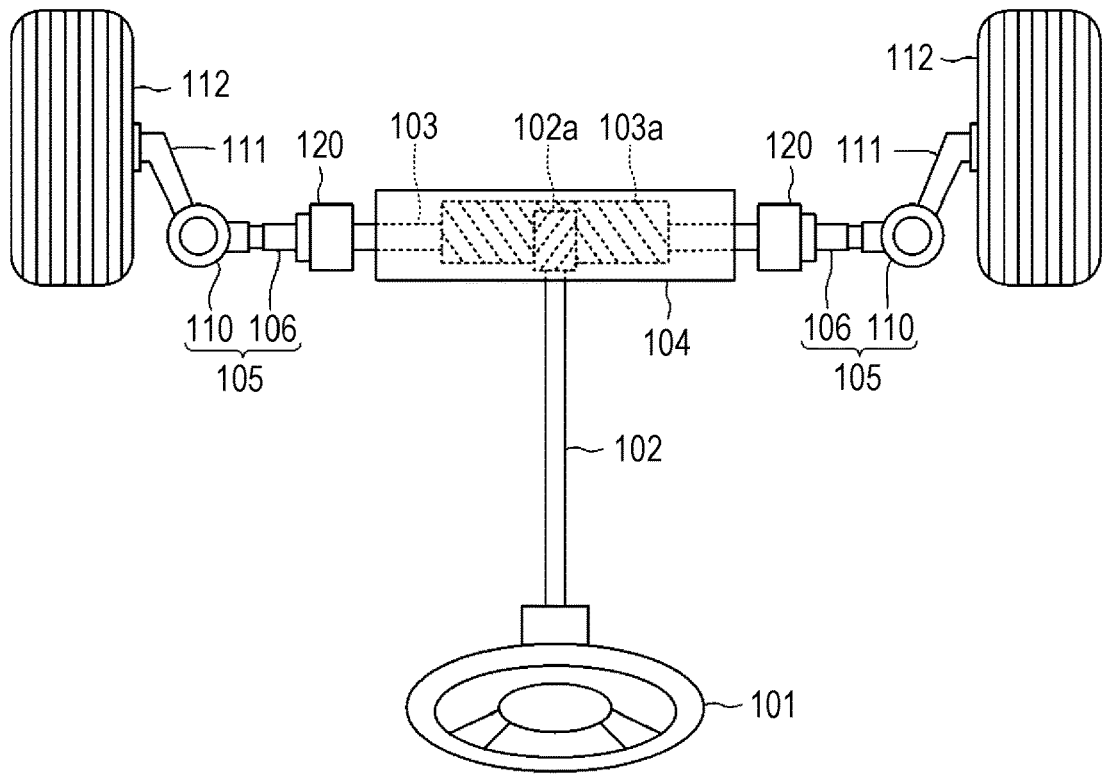
FIG. 1 is a schematic view for describing the outline of an entire configuration of a steering device according to a first embodiment of the present invention.
Figure 2:
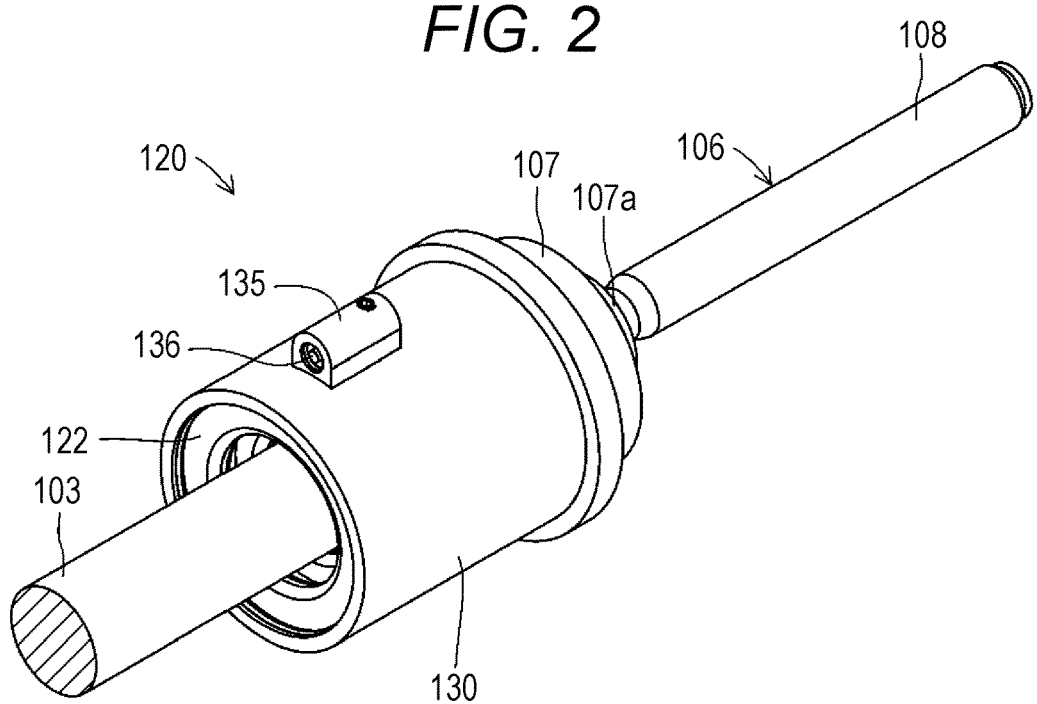
FIG. 2 is a perspective view showing the outline of an external configuration of a linear-motion damper according to the first embodiment of the present invention, the linear-motion damper forming the steering device shown in FIG. 1.
Figure 3:
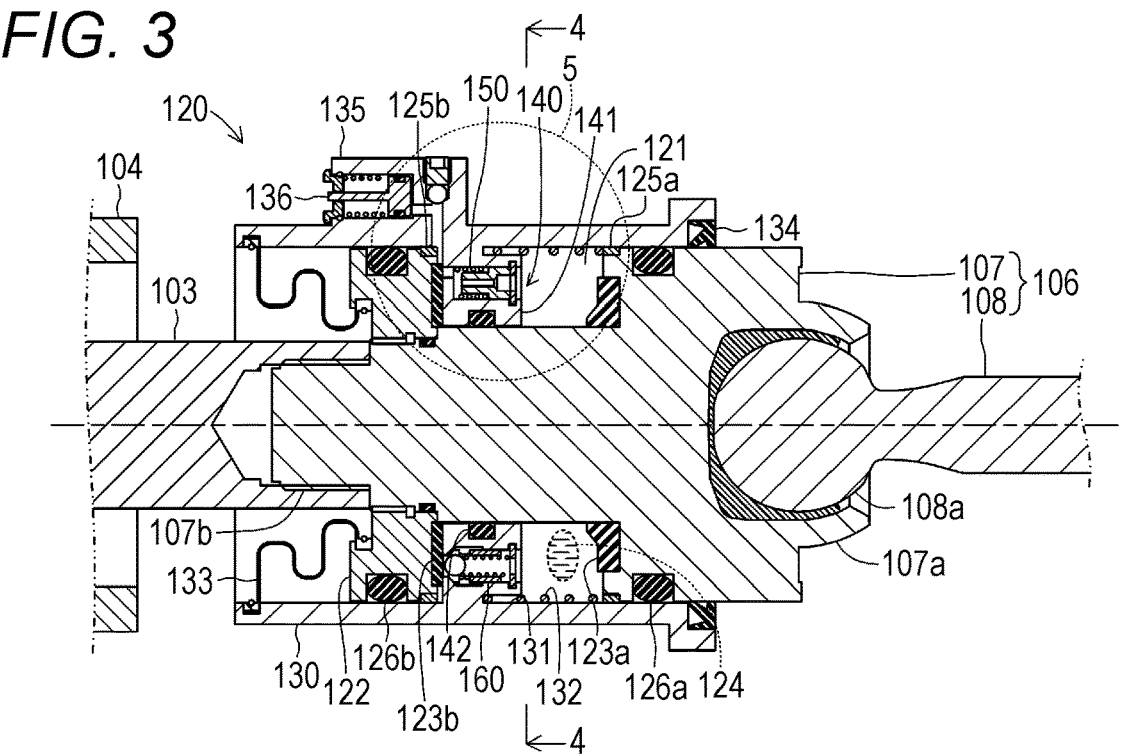
FIG. 3 is a sectional view showing the outline of an internal configuration of the linear-motion damper shown in FIG. 2.
Figure 4:
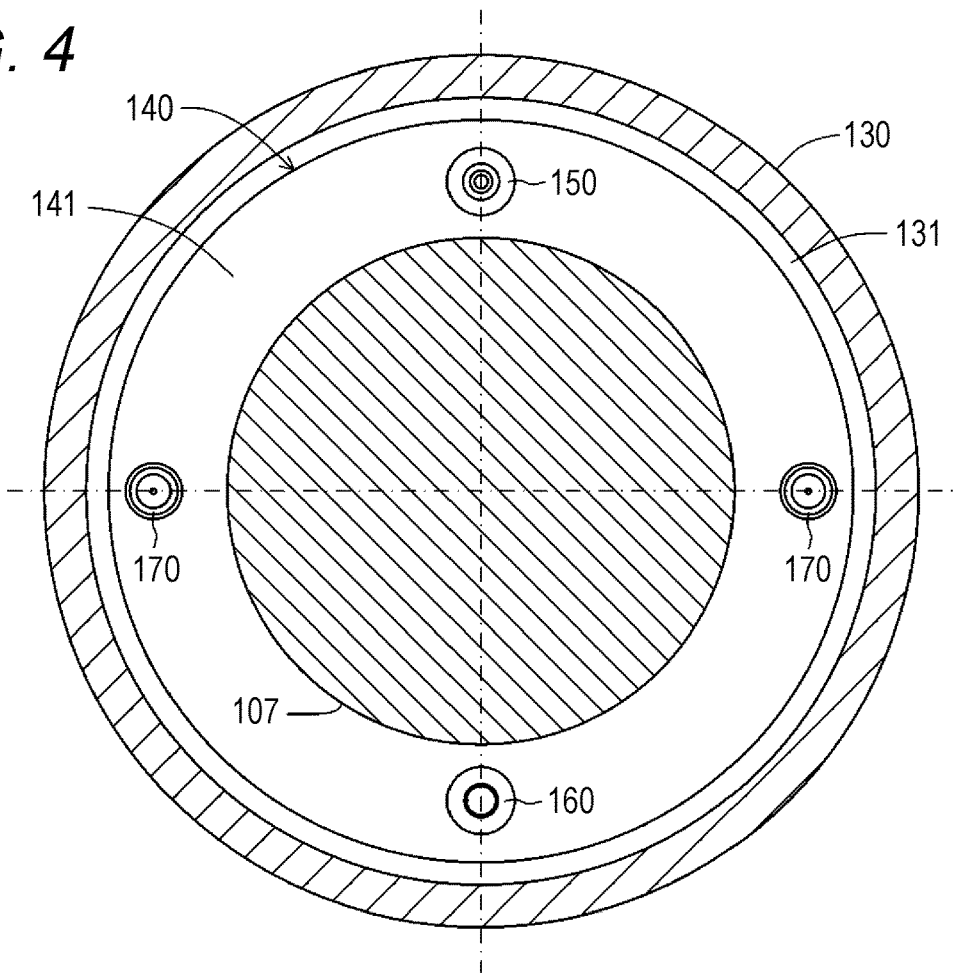
FIG. 4 is a sectional view of a relative displacement body and a socket main body along a 4-4 line shown in FIG. 3.
Figure 5:
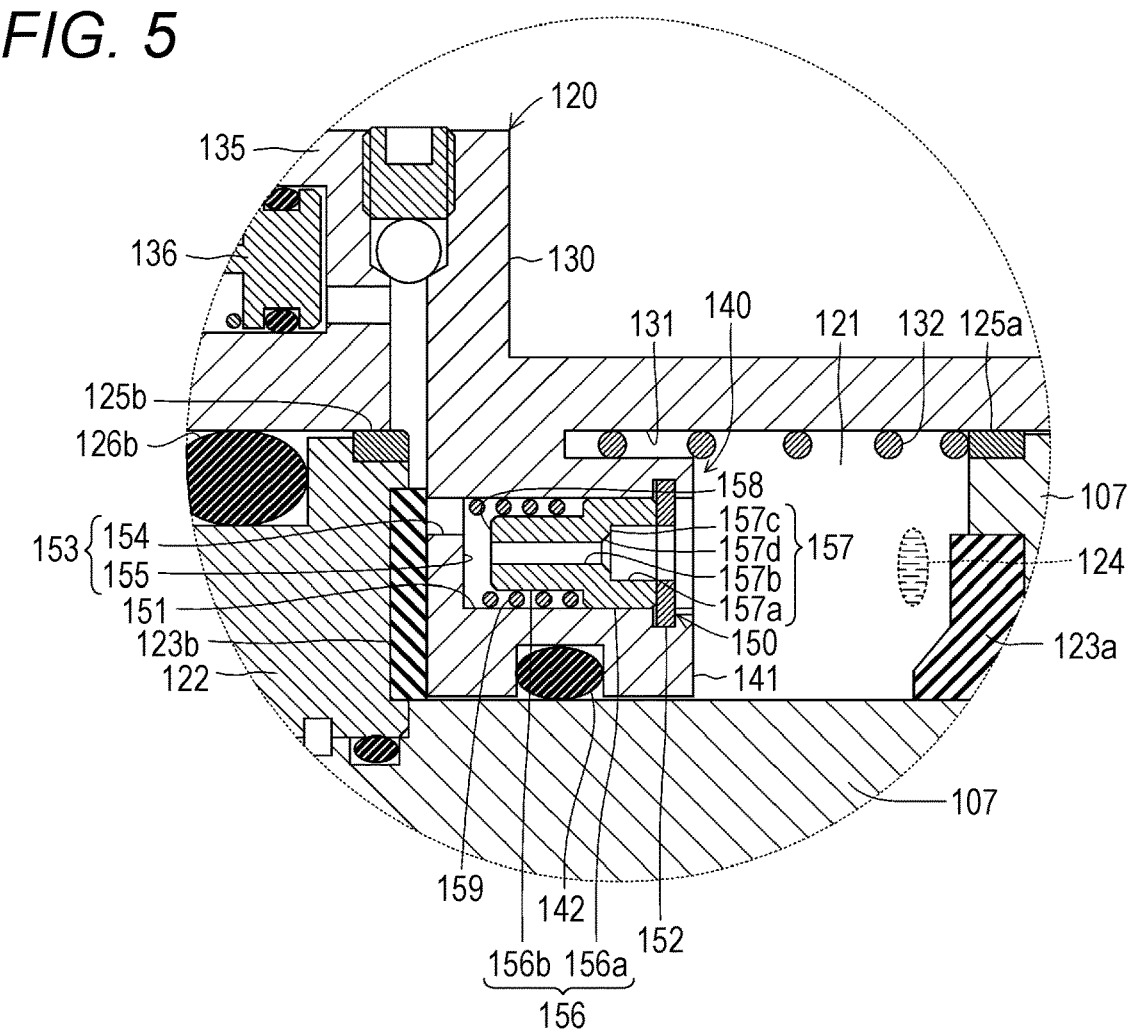
FIG. 5 is a partially-enlarged view showing details of the structure of the linear-motion damper of FIG. 3 in a dashed circle 5.

Hereinafter, a first embodiment as one embodiment of a linear-motion damper and a steering device including the linear-motion dampers according to the present invention will be described with reference to the drawings. FIG. 1 is a schematic view for describing the outline of an entire configuration of a steering device 100 according to the first embodiment of the present invention. FIG. 2 is a perspective view showing the outline of an external configuration of a linear-motion damper 120 according to the first embodiment of the present invention, the linear-motion damper 120 forming the steering device 100 shown in FIG. 1. FIG. 3 is a sectional view showing the outline of an internal configuration of the linear-motion damper 120 shown in FIG. 2. FIG. 4 is a sectional view of an inner chamber forming body 130 and a socket main body 107 along a 4-4 line shown in FIG. 3. FIG. 5 is a partially-enlarged view showing details of the structure of the linear-motion damper 120 of FIG. 3 in a dashed circle 5.

The steering device 100 is a mechanical device for steering two front wheels (or rear wheels) of a four-wheeled self-propelled vehicle (not shown) right and left.

(Configuration of Steering Device 100)

The steering device 100 includes a steering wheel 101. The steering wheel 101 is an operator (i.e., a handle) for manually operating a travelling direction by a driver of the self-propelled vehicle. The steering wheel 101 is formed in such a manner that a resin material or a metal material is formed in a circular ring shape. A steering shaft 102 is coupled to the steering wheel 101.

The steering shaft 102 is a component formed in a bar shape and rotating about an axis according to clockwise or counterclockwise rotary operation of the steering wheel 101. The steering shaft 102 is formed in such a manner that one or more metal bar bodies are coupled through, e.g., a universal joint. The steering wheel 101 is coupled to one end portion of the steering shaft 102, and a pinion gear 102a is formed at the other end portion and a rack bar 103 is coupled to the other end portion.

The rack bar 103 is a component formed in a bar shape and reciprocatably displacing in an axis direction to transmit a force of steering each of two wheels 112 and an amount of steering each of two wheels 112 to a corresponding one of knuckle arms 111. The rack bar 103 is made of a metal material. In this case, a rack gear 103a is formed at part of the rack bar 103, and engages with the pinion gear 102a of the steering shaft 102. That is, the pinion gear 102a and the rack gear 103a form a rack-and-pinion mechanism (a steering gear box) converting rotary motion of the steering shaft 102 into linear reciprocating motion of the rack bar 103.

Both end portions of the rack bar 103 in the axis direction are exposed through a rack housing 104 in a state in which the rack-and-pinion mechanism is covered with the rack housing 104. The wheels 112 are each coupled to both end portions of the rack bar 103 exposed through the rack housing 104 through intermediate coupling bodies 105 and the knuckle arms 111.

The rack housing 104 is a component for covering and protecting a main portion of the rack bar 103, such as the rack-and-pinion mechanism. The rack housing 104 is formed in such a manner that a metal material is formed in a cylindrical shape. The rack housing 104 is attached in a fixed manner to a chassis (not shown) of the self-propelled vehicle.

The intermediate coupling body 105 is a component for transmitting the steering force and the steering amount transmitted from the rack bar 103 to the knuckle arm 111. The intermediate coupling body 105 mainly includes a rack end 106 and a tie rod 110. The rack end 106 is a component movably coupling the tie rod 110 to a tip end portion of the rack bar 103 and formed with the linear-motion damper 120. The rack end 106 mainly includes the socket main body 107 and a stud body 108.

The socket main body 107 is a component movably coupling the stud body 108 to the tip end portion of the rack bar 103 and formed with the linear-motion damper 120. The socket main body 107 is formed in such a manner that a metal material is formed in a round bar shape. A ball holding portion 107a is formed at one (the right side as viewed in the figure) end portion of the socket main body 107, and an external thread portion 107b to be fitted in the tip end portion of the rack bar 103 is formed at the other (the left side as viewed in the figure) end portion. The ball holding portion 107a is formed in such a recessed spherical shape that the ball holding portion 107a is slidably fitted onto a ball portion 108a of the stud body 108 to hold the ball portion 108a. The linear-motion damper 120 is formed between the ball holding portion 107a and the external thread portion 107b of the socket main body 107.

The stud body 108 is a component for movably coupling the tie rod 110 to the socket main body 107. The stud body 108 is formed in such a manner that a metal material is formed in a round bar shape. The spherical ball portion 108a is formed at one (the left side as viewed in the figure) end portion of the stud body 108, and an external thread portion (not shown) to be fitted in an end portion of the tie rod 110 is formed at the other (the right side as viewed in the figure) end portion.

The tie rod 110 is a component movably coupling the knuckle arm 111 to a tip end portion of the rack end 106. The tie rod 110 is formed in such a manner that a ball joint is movably attached to a tip end portion of a tie rod main body extending in a bar shape. The knuckle arm 111 is a metal component for holding the wheel 112 on the tie rod 110 to transmit the steering force and the steering amount transmitted from the tie rod 110 to the wheel 112. The knuckle arm 111 is formed in such a shape that multiple bar-shaped bodies extend from the periphery of a cylindrical portion. The wheels 112 are a pair of right and left components rolling on a rod surface such that the self-propelled vehicle moves back and forth. The wheel 112 is formed in such a manner that a rubber tire is attached to the outside of a metal wheel.

The linear-motion damper 120 is a tool for absorbing strong pressing force (impact) transmitted from the wheel 112. The linear-motion damper 120 is formed at each of the right and left intermediate coupling bodies, more specifically each of the right and left socket main bodies 107. The linear-motion damper 120 includes an inner chamber 121.

The inner chamber 121 is a portion where fluid 124 is housed in a liquid-tight manner. The inner chamber 121 is, on an outer peripheral portion of the socket main body 107, formed in a circular-ring tubular shape cut out in a recessed shape along a circumferential direction and extending in the axis direction. That is, the socket main body 107 forms the rack end 106, and is a component equivalent to a relative displacement body according to the present invention. Of the inner chamber 121, each of a bottom portion and one (the right side as viewed in the figure) end portion in the axis direction of the socket main body 107 is, in the present embodiment, formed by the socket main body 107 itself, and the other (the left side as viewed in the figure) end portion in the axis direction is formed by a wall forming body 122. The outside of the inner chamber 121 is covered with the inner chamber forming body 130.

The wall forming body 122 is a component for forming the left wall portion of the inner chamber 121 as viewed in the figure. The wall forming body 122 is formed in such a manner that a metal material is formed in a circular ring shape. The wall forming body 122 is fitted onto an outer peripheral surface of the socket main body 107 on the other (the left side as viewed in the figure) side in the axis direction, and is integrated with the socket main body 107. At both end portions of the inner chamber 121 in the axis direction of the socket main body 107, buffers 123*a*, 123*b* made of elastomer such as urethane resin and including elastic bodies are provided. In this case, the buffer 123*a* is formed thicker than the buffer 123*b*.

The fluid 124 is a substance for providing resistance to a flow control valve 140 sliding in the inner chamber 121 such that the damper function of the linear-motion damper 120 works. The inner chamber 121 is filled with the fluid 124. The fluid 124 includes a liquid, gel, or semisolid substance having viscosity according to the specifications of the linear-motion damper 120 and fluidity. In this case, the viscosity of the fluid 124 is selected as necessary according to the specifications of the linear-motion damper 120. In the present embodiment, the fluid 124 includes oil such as mineral oil or silicone oil. Note that the fluid 124 is hatched in a dashed circle in FIGS. 3 and 5 (the same also applies to FIGS. 9, 12 to 14, and 16 to 20).

Sliding bushes 125*a*, 125*b* are each fitted onto the outer peripheral surfaces of the socket main body 107 and the wall forming body 122 on both sides of the inner chamber 121 in the axis direction of the socket main body 107. The sliding bush 125*a*, 125*b* is a component for smoothly reciprocatably sliding the inner chamber forming body 130 in the axis direction of the socket main body 107. The sliding bush 125*a*, 125*b* is formed in such a manner that a metal material is formed in a circular ring shape having a slightly-larger outer diameter than the outer diameter of the socket main body 107.

Seal rings 126*a*, 126*b* made of an elastomer material such as a rubber material and including elastic bodies are each fitted onto the outer peripheral surfaces of the socket main body 107 and the wall forming body 122 on the opposite side of these sliding bushes 125*a*, 125*b* from the inner chamber 121. These seal rings 126*a*, 126*b* prevent leakage of the fluid 124 from the inner chamber 121 when the inner chamber forming body 130 slidably displaces relative to the socket main body 107.

The inner chamber forming body 130 is a component covering the outside of the inner chamber 121 in a radial direction and formed with the flow control valve 140. The inner chamber forming body 130 is formed in such a manner that a metal material is formed in a cylindrical shape. Specifically, the inner chamber forming body 130 is formed in such a cylindrical shape that the inner chamber forming body 130 is slidably fitted onto the outer peripheral surface of the socket main body 107. In this case, the inner chamber forming body 130 is formed with such a length that the inner chamber forming body 130 projects from a rack-housing-104-side end portion of the socket main body 107.

The flow control valve 140 is formed so as to project from a center portion of an inner peripheral portion of the inner chamber forming body 130 in the axis direction. An elastic body holding portion 131 is formed between the flow control valve 140 and an inner peripheral surface of the inner chamber forming body 130. A dust boot 133 and a dust seal 134 are each provided at both end portions of the inner peripheral portion of the inner chamber forming body 130 in the axis direction.

The elastic body holding portion 131 is a portion housing one of both end portions of a return elastic body 132. The elastic body holding portion 131 is formed in a circular ring shape between the inner peripheral surface of the inner chamber forming body 130 and the flow control valve 140. The return elastic body 132 is a component for elastically pressing the flow control valve 140 to the left end portion of the inner chamber 121 as viewed in the figure. The return elastic body 132 includes a metal coil spring. One (the left side as viewed in the figure) end portion of the return elastic body 132 is housed in the elastic body holding portion 131 to elastically press the inner chamber forming body 130, and the other (the right side as viewed in the figure) end portion elastically presses the outer peripheral portion of the socket main body 107 through the sliding bush 125*a*. That is, the return elastic body 132 provides elastic force to each of the inner chamber forming body 130 and the socket main body 107 such that the later-described flow control valve 140 is arranged on an external force acting side (a rack housing 104 side) with respect to the linear-motion damper 120.

The dust boot 133 is a component for preventing dust from entering the inner chamber forming body 130 from a rack housing 104 side which is one (the left side as viewed in the figure) of both end portions of the inner chamber forming body 130. The dust boot 133 is formed in such a manner that an elastomer material such as a rubber material is formed in a cylindrical shape. One end portion of the dust boot 133 is connected to the end portion of the inner chamber forming body 130, and the other end portion is connected to the wall forming body 122. Note that the dust boot 133 is not shown in FIG. 2.

The dust seal 134 is, as in the dust boot 133, a component preventing dust from entering the inner chamber forming body 130 from a stud body 108 side which is the other (the right side as viewed in the figure) one of both end portions of the inner chamber forming body 130. The dust seal 134 is formed in such a manner that an elastomer material such as a rubber material is formed in a circular ring shape. The dust seal 134 is fitted in a groove cut out in a circular ring shape at the end portion of the inner chamber forming body 130.

An accumulator housing portion 135 is formed at an outer peripheral portion of the inner chamber forming body 130. The accumulator housing portion 135 is a tubular portion for housing an accumulator 136 in a liquid-tight manner. The accumulator housing portion 135 is formed so as to project onto an outer peripheral surface of the inner chamber forming body 130 and extend in a longitudinal direction of the inner chamber forming body 130. One end portion of the accumulator housing portion 135 communicates with the inner chamber 121 on a first flow body 153 side, and the other end portion is sealed with a plug.

The accumulator 136 is a tool compensating for a volume change in the fluid 124 in the inner chamber 121 due to expansion or contraction caused by a temperature change. The accumulator 136 is configured to house a piston reciprocatably sliding in the accumulator housing portion 135 in a state in which the piston is elastically pressed to an inner chamber 121 side by a coil spring.

The flow control valve 140 is a tool causing the fluid 124 to flow with a limitation on the flow of the fluid 124 in the inner chamber 121 to control the flow of the fluid 124, thereby generating damping force of the linear-motion damper 120. The flow control valve 140 mainly includes each of a valve support 141, a first flow control valve 150, a second flow control valve 160, and third flow control valves 170.

The valve support 141 is a portion formed with each of the first flow control valve 150, the second flow control valve 160, and the third flow control valves 170. The valve support 141 is formed in a flat-plate circular ring shape projecting inward from the inner peripheral portion of the inner chamber forming body 130. An inner peripheral portion of the valve support 141 is formed with a smooth cylindrical surface such that the valve support 141 slides on the bottom portion of the inner chamber 121 in a liquid-tight manner, and a seal ring 142 including an elastic body is fitted in such an inner peripheral portion.

The first flow control valve 150 is a valve functioning as a trigger for generating the maximum damping force when strong impact force acts on the linear-motion damper 120. The first flow control valve 150 mainly includes each of a second flow body housing portion 151, a first flow body 153, a second flow body 156, and a separation elastic body 159. The second flow body housing portion 151 is a portion slidably housing the later-described second flow body 156. The second flow body housing portion 151 is formed in a bottomed tubular shape constantly opened at one (the right side as viewed in the figure) end portion of the valve support 141.

In this case, the second flow body housing portion 151 is formed so as to be constantly opened at one of two side surfaces of the valve support 141 on the front side when the inner chamber forming body 130 slidably displaces against elastic force of the return elastic body 132 relative to the socket main body 107. A retaining ring 152 is fitted in a ring-shaped groove formed close to an opening at an inner peripheral surface of the second flow body housing portion 151. The retaining ring 152 is a component for preventing detachment of the second flow body 156 housed in the second flow body housing portion 151. The retaining ring 152 includes a metal C-shaped ring body.

The first flow body 153 is a portion for controlling the flow of the fluid 124 in cooperation with the second flow body 156. The first flow body 153 mainly includes each of a first flow hole 154 and a first hole diameter restriction portion 155. The first flow hole 154 is a through-hole causing the fluid 124 to flow, and is formed at a bottom portion of the second flow body housing portion 151. In this case, the first flow hole 154 is formed at an edge portion of the bottom portion eccentric with respect to the center line of the second flow body housing portion 151. That is, the second flow body housing portion 151 is opened larger on one side (a buffer 123a side) of the inner chamber 121, and due to the first flow hole 154, is opened smaller on the other side (a buffer 123b side).

The first hole diameter restriction portion 155 is a portion blocking the flow of the fluid 124 in a second flow hole 157. The first hole diameter restriction portion 155 is formed in a wall shape at the periphery of the first flow hole 154. Moreover, the first hole diameter restriction portion 155 is formed at a position facing the second flow hole 157 so as to fully close the second flow hole 157 of the second flow body 156 when the second flow body 156 has contacted the first flow body 153. In the present embodiment, the first hole diameter restriction portion 155 is formed by the bottom portion of the second flow body housing portion 151.

The second flow body 156 is a component for controlling the flow of the fluid 124 in cooperation with the first flow body 153. The second flow body 156 is formed in such a manner that a metal material is formed in a cylindrical shape. In this case, the second flow body 156 includes a large-diameter portion 156a sliding on the inner peripheral surface of the second flow body housing portion 151 and a small-diameter portion 156b having a smaller diameter than that of the large-diameter portion 156a. Each of the second flow hole 157 and a second hole diameter restriction portion 158 is formed at the second flow body 156.

The second flow hole 157 is a through-hole causing the fluid 124 to flow. The second flow hole 157 includes a large-diameter hole 157a and a small-diameter hole 157b penetrating the second flow body 156. The large-diameter hole 157a is, at the second flow body 156, formed so as to be opened at the front surface when the inner chamber forming body 130 slidably displaces against the elastic force of the return elastic body 132. The small-diameter hole 157b extends from the farthest portion of the large-diameter hole 157a to the rear surface, and is opened when the inner chamber forming body 130 slidably displaces against the elastic force of the return elastic body 132.

In this case, a flat-plate annular step portion 157c is formed between the large-diameter hole 157a and the small-diameter hole 157b. The small-diameter hole 157b is formed with a tapered portion 157d in a tapered shape, and at the tapered portion 157d, the hole diameter continuously decreases from an end portion on a large-diameter hole 157a side toward the far side of the small-diameter hole 157b. The small-diameter hole 157b is formed at such a position with such a size that the small-diameter hole 157b communicates with the large-diameter hole 157a and faces the first hole diameter restriction portion 155 without facing the first flow hole 154. That is, the small-diameter hole 157b is formed at such a position with such a size that, on the first hole diameter restriction portion 155, the small-diameter hole 157b does not overlap with the first flow hole 154. In the present embodiment, the small-diameter hole 157b is formed concentrically with the second flow body 156 and the large-diameter hole 157a, and is formed with a smaller diameter than that of the first flow hole 154.

The second hole diameter restriction portion 158 is a portion blocking the flow of the fluid 124 in the first flow hole 154. The second hole diameter restriction portion 158 is formed in a wall shape at the periphery of the small-diameter hole 157b forming the second flow hole 157. Specifically, the second hole diameter restriction portion 158 is formed at a position facing the first flow hole 154 so as to partially close the first flow hole 154 of the first flow body 153 when the second flow body 156 has contacted the first flow body 153. In the present embodiment, the second hole diameter restriction portion 158 is formed in a flat-plate annular shape with such a size that the second hole diameter restriction portion 158 closes about ⅓ of the first flow hole 154 of the first flow body 153 when the second flow body 156 has contacted the first flow body 153.

The separation elastic body 159 is a component producing an elastic force of separating the second flow body 156 from the first flow body 153 in the second flow body housing portion 151. The separation elastic body 159 includes a metal coil spring. One (the left side as viewed in the figure) end portion of the separation elastic body 159 presses the first hole diameter restriction portion 155 (the bottom portion of the second flow body housing portion 151), and the other (the right side as viewed in the figure) end portion is fitted onto an outer peripheral portion of the small-diameter portion 156b. The elastic force of the separation elastic body 159 is set to a level corresponding to the magnitude of external force for which the linear-motion damper 120 needs to generate the maximum damping force. One first flow control valve 150 is provided at the valve support 141.

The second flow control valve 160 is a valve blocking the flow of the fluid 124 from the front side to the rear side in slide displacement when the inner chamber forming body 130 slidably displaces against the elastic force of the return elastic body 132 relative to the socket main body 107, and is also a valve allowing the fluid 124 to easily flow from the front side to the rear side in slide displacement when the inner chamber forming body 130 slidably displaces by the elastic force of the return elastic body 132. That is, the second flow control valve 160 includes a one-way valve. The configuration of the one-way valve as the second flow control valve 160 is well-known, and therefore, detailed description thereof will be omitted. One second flow control valve 160 is provided at a position of 180° from the first flow control valve 150 in the circumferential direction at the valve support 141.

The third flow control valve 170 is a valve causing the fluid 124 to flow with the limitation on the flow of the fluid 124 when the inner chamber forming body 130 slidably displaces against the elastic force of the return elastic body 132 relative to the socket main body 107 and when the inner chamber forming body 130 slidably displaces by the elastic force of the return elastic body 132. The third flow control valve 170 includes a thin through-hole formed at the valve support 141. In the present embodiment, the third flow control valves 170 are each formed at two intermediate positions between the first flow control valve 150 and the second flow control valve 160 in the circumferential direction at the valve support 141.

(Actuation of Steering Device 100)

Next, actuation of the steering device 100 configured as described above will be described. The steering device 100 is incorporated as the mechanism that steers the steered wheels (e.g., two front wheels) of the not-shown four-wheeled self-propelled vehicle right and left into the self-propelled vehicle. The steering device 100 changes the direction of each of two wheels 112 according to operation of the steering wheel 101 by the driver of the self-propelled vehicle, thereby determining the travelling direction of the self-propelled vehicle.

During travelling of such a self-propelled vehicle, each linear-motion damper 120 in the steering device 100 is activated when the rack bar 103 has displaced to the vicinity of a right or left displacement limit with respect to the pinion gear 102*a*. In this case, the displacement limit of the rack bar 103 is a right or left steering limit of the wheel 112, and for example, includes not only a case where the driver of the self-propelled vehicle has turned the steering wheel 101 clockwise or counterclockwise to the vicinity of a turning limit, but also a case where great input acts on the rack bar 103 from a wheel 112 side due to collision of the wheel 112 with an obstacle such as a curb stone.

First, a case where the linear-motion damper 120 is not activated because no external force acts on the linear-motion damper 120 will be described. As shown in FIG. 3, the inner chamber forming body 130 does not contact the rack housing 104 within an area where the rack bar 103 does not reach the vicinity of the displacement limit, such as a case where the wheel 112 of the self-propelled vehicle is not steered to the vicinity of the steering limit, and therefore, the linear-motion damper 120 is not activated. In this case, in the linear-motion damper 120, the flow control valve 140 is pressed against the wall forming body 122 in the inner chamber 121 through the buffer 123*b* by the elastic force of the return elastic body 132, as shown in FIG. 5. That is, the inner chamber forming body 130 is maintained in a state in which the inner chamber forming body 130 is elastically positioned at a position closest to the rack housing 104 side on the socket main body 107.

The first flow control valve 150 is maintained in a state in which the second flow body 156 is positioned at a position farthest from the first flow body 153 by the elastic force of the separation elastic body 159. That is, the first flow control valve 150 is in a state in which the flow of the fluid 124 is allowed.

Figure 6:
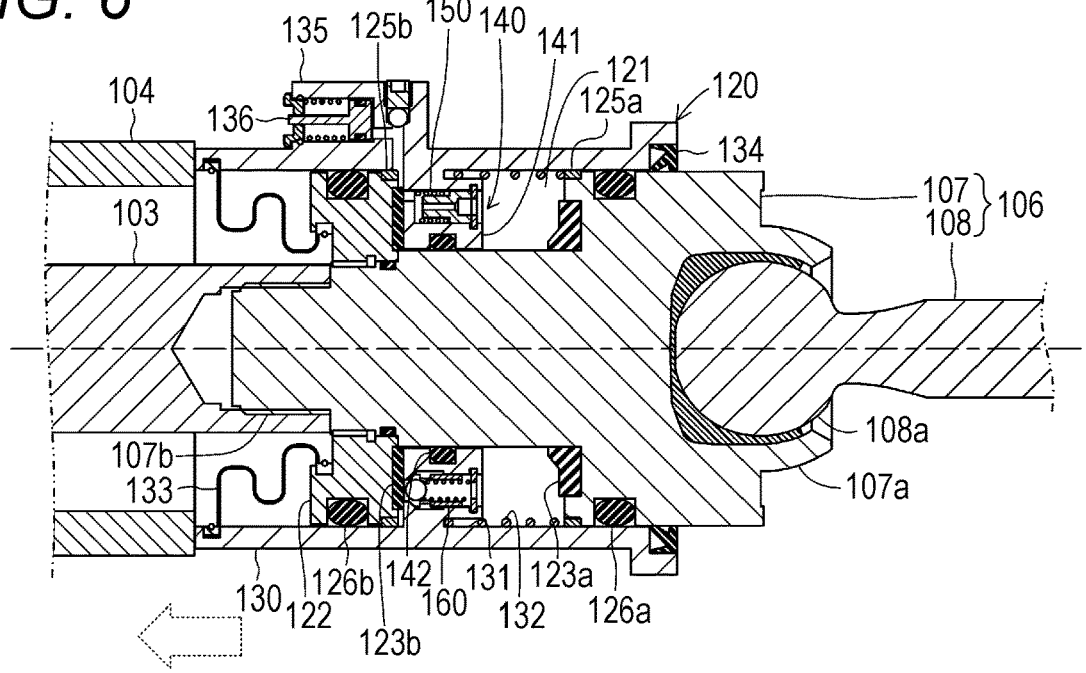
FIG. 6 is a sectional view showing the state of the linear-motion damper shown in FIG. 3 at a moment when the relative displacement body has contacted a rack housing.

Next, a case where the linear-motion damper 120 is activated because external force acts on the linear-motion damper 120 will be described. As shown in FIG. 6, in a case where the rack bar 103 has reached the vicinity of the displacement limit (see a dashed arrow), such as a case where the wheel 112 of the self-propelled vehicle has been steered to the vicinity of the steering limit, the end portion of the inner chamber forming body 130 contacts the rack housing 104, and the linear-motion damper 120 is activated. In this case, the case where the linear-motion damper 120 is activated includes a case where the end portion of the inner chamber forming body 130 has contacted the rack housing 104 with weak force or strong force.

Figure 7:
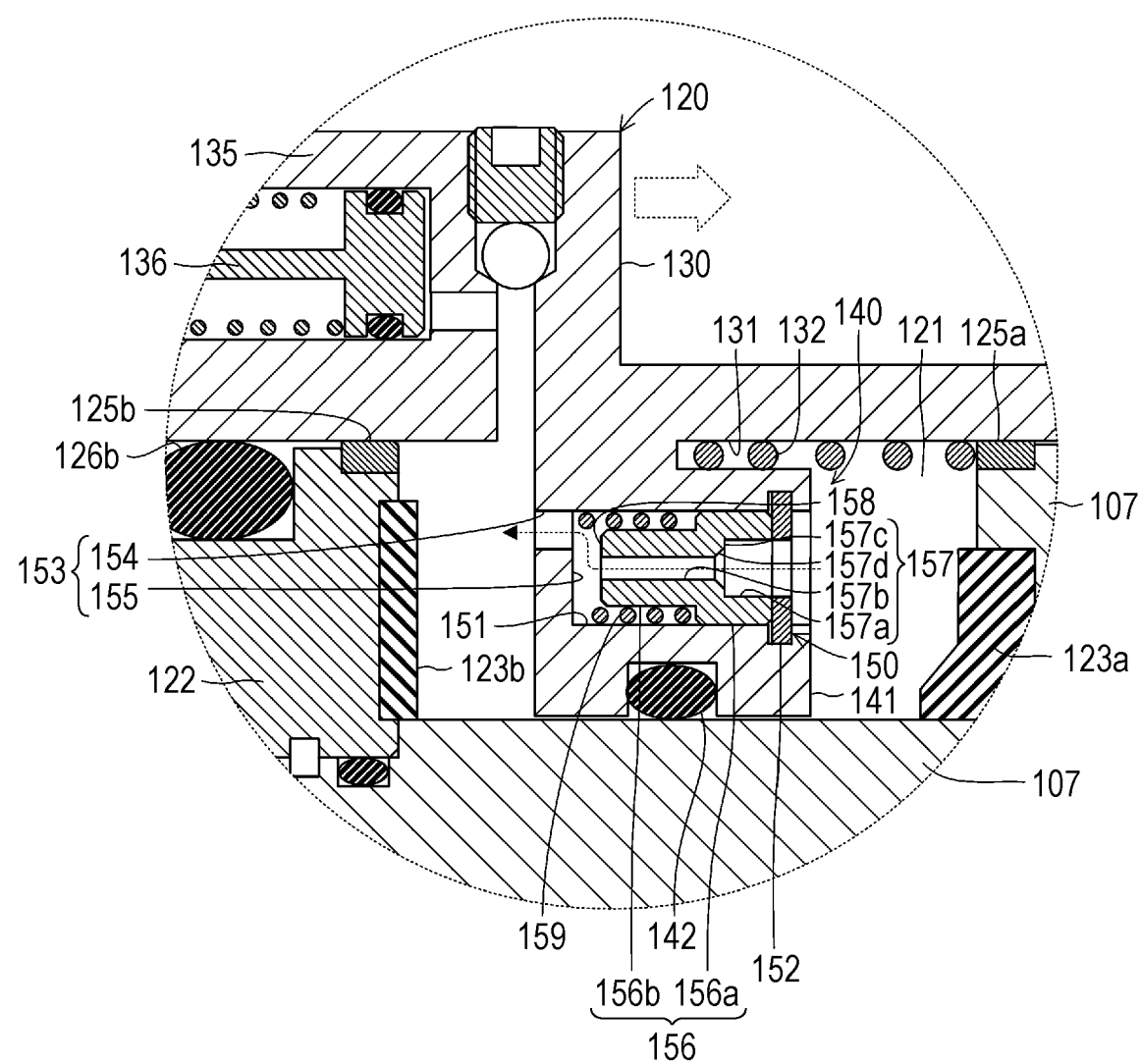
FIG. 7 is a partially-enlarged view showing the state of the linear-motion damper shown in FIG. 5 when a first flow control valve causes fluid to flow.

First, in a case where the end portion of the inner chamber forming body 130 has contacted the rack housing 104 with weak force (low speed), the inner chamber forming body 130 slowly slidably displaces to the stud body 108 side relative to the socket main body 107, as shown in FIG. 7 (see a dashed arrow). That is, the flow control valve 140 displaces to the buffer 123*a* side against the elastic force of the return elastic body 132 in the inner chamber 121. In this case, in the first flow control valve 150, the fluid 124 flows in from the large-diameter hole 157*a* side of the second flow hole 157 of the second flow body 156, and flows toward a small-diameter hole 157*b* side.

However, in this case, since the flow control valve 140 slowly displaces in the inner chamber 121, a force of pressing the second flow body 156 is smaller than the elastic force of the separation elastic body 159. Thus, the second flow body 156 is not pressed against the first flow body 153 after having displaced to the first flow body 153 side. Consequently, in the first flow control valve 150, the fluid 124 on the front side in the displacement direction flows, with slight flow resistance, to the rear side in the displacement direction through each of the second flow hole 157 of the second flow body 156 and the first flow hole 154 of the first flow body 153 (see a dashed arrow).

Since the second flow control valve 160 is the one-way valve blocking the flow of the fluid 124 from the front side to the rear side in the displacement direction of the flow control valve 140 when the inner chamber forming body 130 slidably displaces against the elastic force of the return elastic body 132, the fluid 124 does not flow. Since the third flow control valve 170 is the valve allowing the fluid 124 to flow in both directions, i.e., the front side and the rear side, in the displacement direction of the flow control valve 140, the fluid 124 flows, with slight flow resistance, from the front side to the rear side in the displacement direction of the flow control valve 140.

Thus, the flow control valve 140 displaces to the buffer 123*a* side while generating ignorable extremely-small damping force. Accordingly, the inner chamber forming body 130 slowly slidably displaces to the stud body 108 side.

Thereafter, in a case where the rack bar 103 has displaced to a knuckle arm 111 side such that the end portion of the inner chamber forming body 130 is separated from the rack housing 104, the inner chamber forming body 130 displaces to an original position by the elastic force of the return elastic body 132 (see FIG. 5). In this case, in the first flow control valve 150, the fluid 124 flows in from the first flow body 153 side, and flows toward a second flow body 156 side.

In this case, the second flow body 156 returns to an original position farthest from the first flow body 153 by the elastic force of the separation elastic body 159 and the pressing force of the fluid 124 having flowed from the first flow body 153. Thus, in the first flow control valve 150, the fluid 124 on the front side in the displacement direction flows, with slight flow resistance, to the rear side in the displacement direction through each of the first flow hole 154 of the first flow body 153 and the second flow hole 157 of the second flow body 156.

Since the second flow control valve 160 is the one-way valve allowing the fluid 124 to flow from the front side to the rear side in the displacement direction of the flow control valve 140 when the inner chamber forming body 130 slidably displaces by the elastic force of the return elastic body 132, the fluid 124 flows with slight flow resistance. Since the third flow control valve 170 is the valve allowing the fluid 124 to flow in both directions, i.e., the front side and the rear side, in the displacement direction of the flow control valve 140, the fluid 124 flows, with slight flow resistance, from the front side to the rear side in the displacement direction of the flow control valve 140.

Thus, the flow control valve 140 displaces to the buffer 123b side while generating ignorable extremely-small damping force. Accordingly, the inner chamber forming body 130 slidably displaces to the rack housing 104 side faster than the above-described displacement speed.

Next, in a case where the end portion of the inner chamber forming body 130 has contacted the rack housing 104 with strong force (high speed) (e.g., abrupt steering by the driver or collision of the wheel 112 with, e.g., a curbstone), the inner chamber forming body 130 rapidly slidably displaces to the stud body 108 side relative to the socket main body 107. That is, the flow control valve 140 rapidly displaces to the buffer 123a side against the elastic force of the return elastic body 132 in the inner chamber 121.

Figure 8:
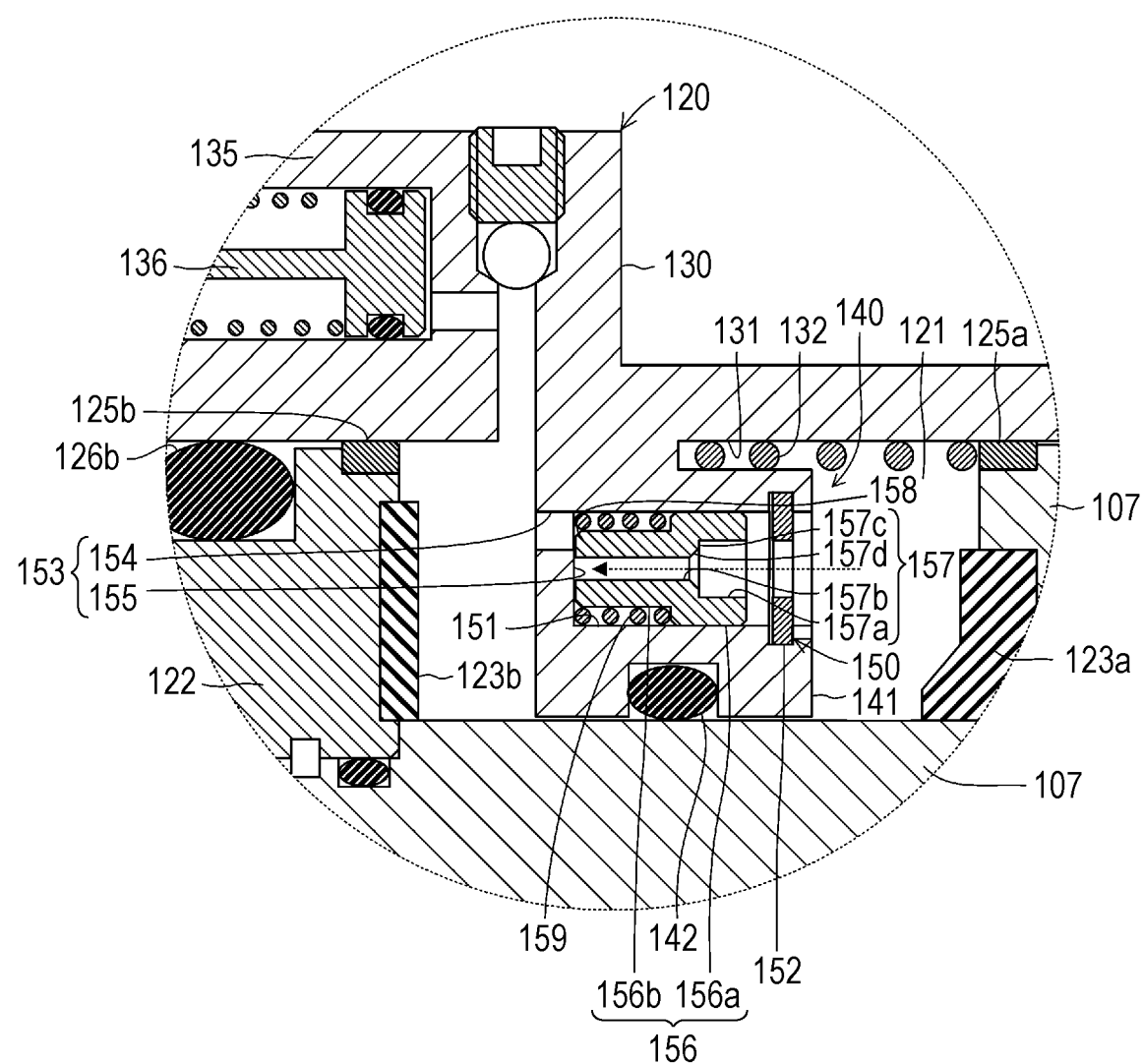
FIG. 8 is a partially-enlarged view showing the state of the linear-motion damper shown in FIG. 5 when the first flow control valve does not cause the fluid to flow.

In this case, in the first flow control valve 150, a force of pressing the second flow body 156 by the fluid 124 is greater than the elastic force of the separation elastic body 159, and therefore, the second flow body 156 displaces to the first flow body 153 side and is pressed against the first flow body 153, as shown in FIG. 8. In this case, after the second flow body 156 has started displacing to the first flow body 153 side by action of the pressing force of the fluid 124 on the step portion 157c and the tapered portion 157d of the small-diameter hole 157b, the pressing force of the fluid 124 also acts on an end portion of the large-diameter hole 157a, and accordingly, the second flow body 156 displaces to the first flow body 153 side.

Moreover, in this case, since the first hole diameter restriction portion 155 and the second hole diameter restriction portion 158 are each formed at the positions facing the second flow hole 157 and the first flow hole 154, the first hole diameter restriction portion 155 and the second hole diameter restriction portion 158 close the entirety of the second flow hole 157 and part of the first flow hole 154. Thus, in the first flow control valve 150, the fluid 124 does not flow (see a dashed arrow) upon displacement of the flow control valve 140 to the stud body 108 side. Further, in this case, the fluid 124 does not flow in the second flow control valve 160 as in the above-described case.

Since the fluid 124 can flow only in the third flow control valve 170 in the flow control valve 140, extremely-great flow resistance is generated at the third flow control valve 170. Thus, the flow control valve 140 displaces to the buffer 123a side against the extremely-great flow resistance by the third flow control valve 170. Accordingly, the inner chamber forming body 130 slidably displaces to the stud body 108 side while generating extremely-great damping force. That is, the linear-motion damper 120 can damp strong impact generated on the rack bar 103.

Thereafter, in a case where the rack bar 103 has displaced to the knuckle arm 111 side such that the end portion of the inner chamber forming body 130 is separated from the rack housing 104, the inner chamber forming body 130 displaces, as in the above-described case, to the original position by the elastic force of the return elastic body 132 (see FIG. 5). That is, the flow control valve 140 displaces to the buffer 123b side while generating ignorable extremely-small damping force, and therefore, the inner chamber forming body 130 quickly slidably displaces to the rack housing 104 side.

The second flow body 156 is separated from the first flow body 153 by the elastic force of the separation elastic body 159 and the pressing force of the fluid 124 having flowed from the first flow body 153, and returns to the original position. In this case, since the second hole diameter restriction portion 158 is formed at the position facing part of the first flow hole 154, the second flow body 156 can guide part of the fluid 124 having flowed into the second flow body housing portion 151 through the first flow hole 154 to a second flow hole 157 side. In the first flow control valve 150, the fluid 124 on the front side in the displacement direction flows, with slight flow resistance, to the rear side in the displacement direction through each of the first flow hole 154 of the first flow body 153 and the second flow hole 157 of the second flow body 156, as described above.

As can be understood from description of the actuation method above, according to the first embodiment, in the linear-motion damper 120, the socket main body 107 as the relative displacement body is provided so as to penetrate the inner chamber forming body 130 formed in the tubular shape. Thus, the linear-motion damper 120 can be provided not on the axis direction of the rack end 106 extending in the shaft shape in the steering device 100 as a target to which the linear-motion damper 120 is to be attached, but outside the rack end 106 in the radial direction. Consequently, an increase in the size (mainly, the length) of the device configuration of the steering device 100 can be avoided, and the type of steering device to which the linear-motion damper 120 is attachable can be broadened.

Second Embodiment

Next, a second embodiment of a steering device including flow control valves and linear-motion dampers according to the present invention will be described with reference to FIGS. 9 to 13. A steering device 200 in the second embodiment is different from that of the first embodiment in that a linear-motion damper 210 equivalent to the linear-motion damper 120 in the first embodiment is not assembled with a socket main body 107, but with a rack housing 104. Thus, for the steering device 200 in the second embodiment, differences from the steering device 200 in the first embodiment will be mainly described, and description of common contents or corresponding contents between both embodiments will be omitted as necessary. In description of the second embodiment, the same reference numerals as those of the first embodiment will be used to represent components similar to those of the first embodiment.

(Configuration of Steering Device 200)

In the steering device 200, the cylindrical linear-motion damper 210 is attached to a tip end portion of the rack housing 104 formed in a cylindrical shape. Further, a dust boot 201 is attached so as to cover the linear-motion damper 210. The dust boot 201 is a component for preventing contamination of the linear-motion damper 210. The dust boot 201 is formed in such a manner that an elastomer material such as a rubber material is formed in a cylindrical shape.

A rack bar 103 penetrating the rack housing 104 penetrates the cylindrical linear-motion damper 210 attached to the tip end portion of the rack housing 104. A rack end 106 is attached to a tip end portion of the rack bar 103. In this case, an outer peripheral portion of the socket main body 107 attached to the rack bar 103 is formed so as to project in a flange shape from an outer peripheral portion of the rack bar 103, and is formed so as to face an end portion of a relative displacement body 230.

The linear-motion damper 210 includes an inner chamber forming body 211. The inner chamber forming body 211 is a component forming an inner chamber 217, and is also a component for attaching the linear-motion damper 210 to the rack housing 104. The inner chamber forming body 211 is formed in such a manner that a metal material is formed in a cylindrical shape. That is, the inner chamber forming body 211 corresponds to the inner chamber forming body 130 in the first embodiment. One (the left side as viewed in the figure) end portion of an outer peripheral portion of the inner chamber forming body 211 is formed with an external thread portion 211a to be screwed into the rack housing 104, and the other (the right side as viewed in the figure) end portion is formed with each of an oil supply port 212 and an accumulator housing portion 213.

The oil supply port 212 is a flow path for injecting fluid 124 into the inner chamber 217 or discharging the fluid 124 from the inner chamber 217. The oil supply port 212 is openably closed with a plug. The accumulator housing portion 213 and an accumulator 214 each correspond to the accumulator housing portion 135 and the accumulator 136 in the first embodiment. Wall forming bodies 215, 216 are each screwed into both end portions of the inner chamber forming body 211. The cylindrical inner chamber 217 is formed between these two wall forming bodies 215, 216.

The wall forming bodies 215, 216 are components for forming both the right and left wall portions of the inner chamber 217 as viewed in the figure. The wall forming body 215, 216 is formed in such a manner that a metal material is formed in a circular ring shape. That is, the wall forming body 215, 216 corresponds to the wall forming body 122 in the first embodiment. Thus, the inner chamber 217 is formed in a circular-ring tubular shape extending in an axis direction among the wall forming bodies 215, 216 and the later-described relative displacement body 230 inside the inner chamber forming body 211. A return elastic body 218 is fitted onto an outer peripheral portion of the intermediate-coupling-body-105-side wall forming body 216 of these wall forming bodies 215, 216.

The return elastic body 218 is a component for elastically pressing a flow control valve 240 to the right end portion in the inner chamber 217 as viewed in the figure. The return elastic body 218 includes a metal coil spring. That is, the return elastic body 218 corresponds to the return elastic body 132 in the first embodiment. One (the left side as viewed in the figure) end portion of the return elastic body 218 elastically presses the wall forming body 216, and the other (the right side as viewed in the figure) end portion elastically presses the relative displacement body 230 through a backing plate 218a. That is, the return elastic body 218 provides elastic force to each of an inner chamber forming body 211 and the socket main body 107 such that the flow control valve 240 is arranged on an external force acting side (a ball holding portion 107a side) with respect to the linear-motion damper 210.

The wall forming body 215, 216 is provided with a buffer 221a, 221b, a sliding bush 222a, 222b, a seal ring 223a, 223b, and a dust seal 224a, 224b each corresponding to the buffer 123a, 123b, the sliding bush 125a, 125b, the seal ring 126a, 126b, and the dust seal 134 in the first embodiment.

The relative displacement body 230 is a component covering the inside of the inner chamber 217 in a radial direction and formed with the flow control valve 240. The relative displacement body 230 is formed in such a manner that a metal material is formed in a cylindrical shape. That is, the relative displacement body 230 corresponds to the socket main body 107 in the first embodiment. The relative displacement body 230 is formed in such a cylindrical shape that the relative displacement body 230 is slidably fitted in inner peripheral surfaces of the wall forming bodies 215, 216 through the sliding bushes 222a, 222b. In this case, the relative displacement body 230 is formed with such a length that the relative displacement body 230 projects from each end portion of the wall forming bodies 215, 216. The inner diameter of the relative displacement body 230 is formed with such a size that the rack bar 103 penetrates therethrough.

The backing plate 218a is attached in a fixed manner to one (the right side as viewed in the figure) end portion of an outer peripheral portion of the relative displacement body 230, and each of a fixing sleeve 231 and the flow control valve 240 is attached to a portion from the other (the left side as viewed in the figure) end portion to a center portion in the axial direction. The fixing sleeve 231 is a component for pressing the flow control valve 240 fitted onto a small-diameter portion of the outer peripheral portion of the relative displacement body 230 against a large-diameter portion of the outer peripheral portion of the relative displacement body 230 and fixing the flow control valve 240 to the large-diameter portion. The fixing sleeve 231 is formed in such a manner that a metal material is formed in a cylindrical shape. The fixing sleeve 231 is assembled integrally with the relative displacement body 230 with fitted onto the outer peripheral portion of the relative displacement body 230. The fixing sleeve 231 slides relative to the wall forming body 215 through the sliding bush 222a.

The flow control valve 240 is a tool causing the fluid 124 to flow with a limitation on the flow of the fluid 124 in the inner chamber 217 to control the flow of the fluid 124, thereby generating damping force of the linear-motion damper 210. The flow control valve 240 corresponds to the flow control valve 140 in the first embodiment. The flow control valve 240 mainly includes each of a valve support 241, a first flow control valve 150, a second flow control valve 160, and third flow control valves 170.

The valve support 241 is a component formed with each of the first flow control valve 150, the second flow control valve 160, and the third flow control valves 170. The valve support 241 is formed in such a manner that a metal material is formed in a flat-plate circular ring shape. That is, the valve support 241 is formed separately from the relative displacement body 230, and is integrally attached to the relative displacement body 230 through the fixing sleeve 231. A seal ring 242 corresponding to the seal ring 142 in the first embodiment is fitted onto an outer peripheral portion of the valve support 241.

The first flow control valve 150, the second flow control valve 160, and the third flow control valve 170 are configured similar to those of the above-described embodiment, and therefore, description thereof will be omitted. The flow control valve 240 is attached to the outer peripheral portion of the relative displacement body 230 in such an orientation that a large-diameter portion 156a of a second flow body 156 of the first flow control valve 150 is opened on a buffer 221a side (the left side as viewed in the figure).

(Actuation of Steering Device 200)

Next, actuation of the steering device 200 configured as described above will be described. As in the steering device 100 of the above-described embodiment, in the steering device 200, each linear-motion damper 210 is activated when the rack bar 103 has displaced to the vicinity of a right or left displacement limit with respect to a pinion gear 102a.

Figure 9:
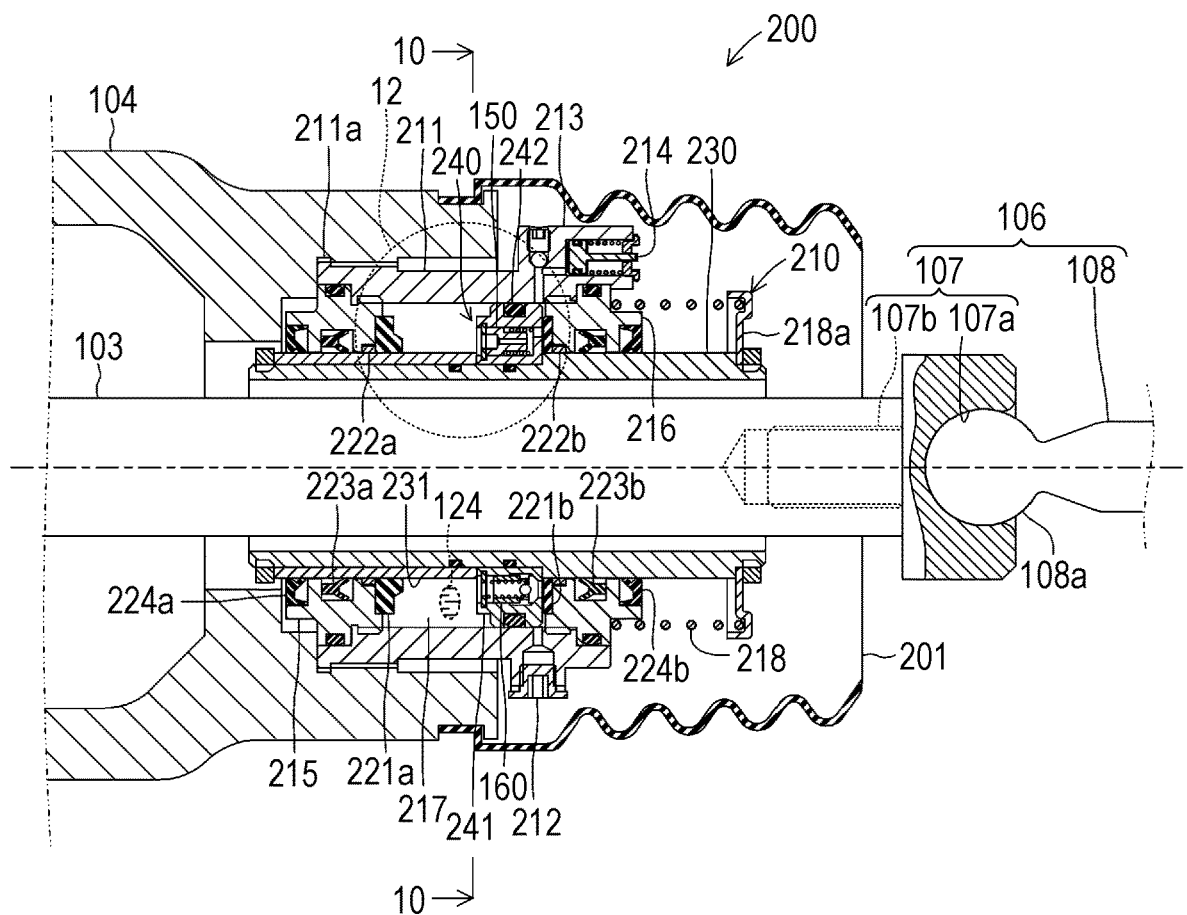
FIG. 9 is a sectional view showing the outline of an internal configuration of a linear-motion damper according to a second embodiment of the present invention.
Figure 10:
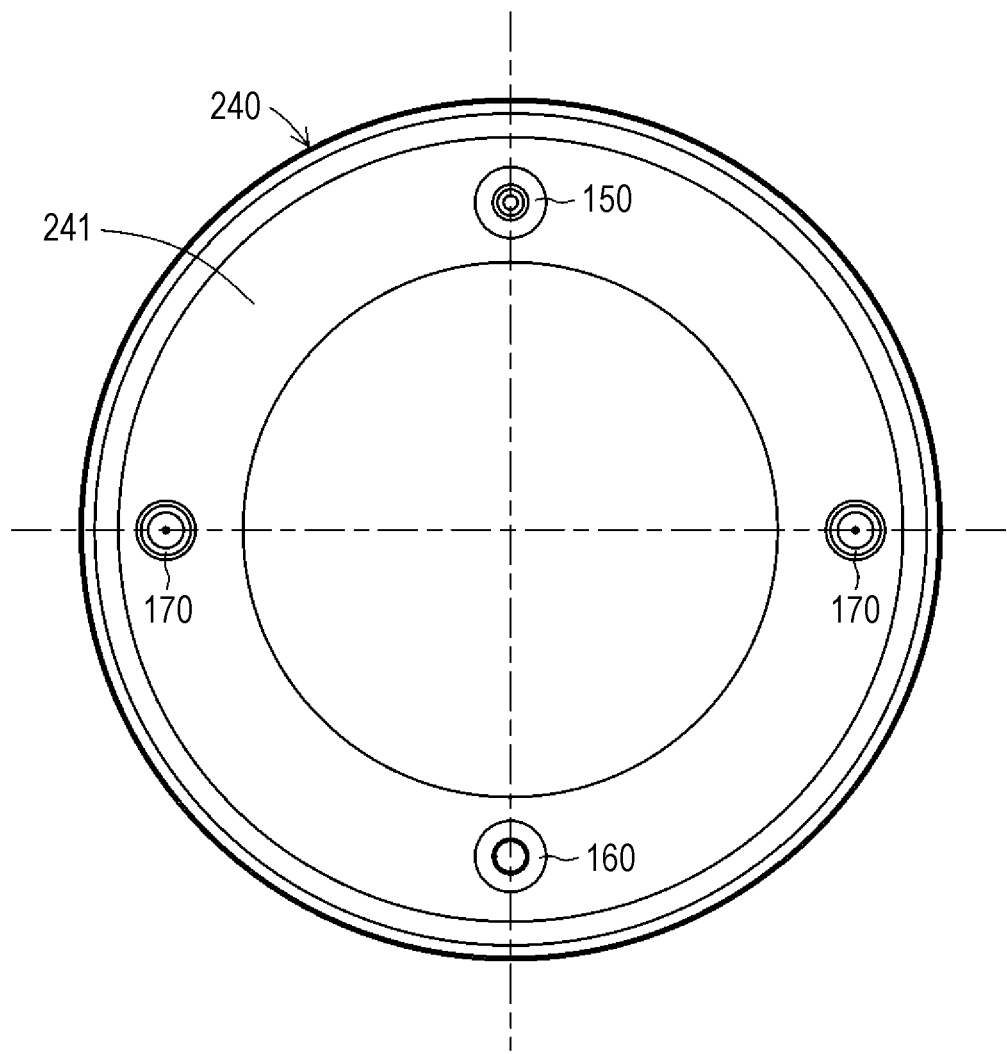
FIG. 10 is a front view of only a flow control valve along a 10-10 line shown in FIG. 9.

Specifically, the socket main body 107 does not contact the relative displacement body 230 within an area where the rack bar 103 does not reach the vicinity of the displacement limit, such as a case where a wheel 112 of a self-propelled vehicle is not steered to the vicinity of a steering limit, and therefore, the linear-motion damper 210 is not activated (see FIG. 9). In this case, in the linear-motion damper 210, the flow control valve 240 is pressed against the wall forming body 216 through the buffer 221b by elastic force of the return elastic body 218 in the inner chamber 217. That is, the relative displacement body 230 is maintained in a state in which the relative displacement body 230 is elastically positioned at a position closest to a socket main body 107 side in the inner chamber 217.

Further, the first flow control valve 150 is maintained in a state in which the second flow body 156 is positioned at a position farthest from the first flow body 153 by the elastic force of the separation elastic body 159. That is, the first flow control valve 150 is in a state in which the flow of the fluid 124 is allowed.

Figure 11:
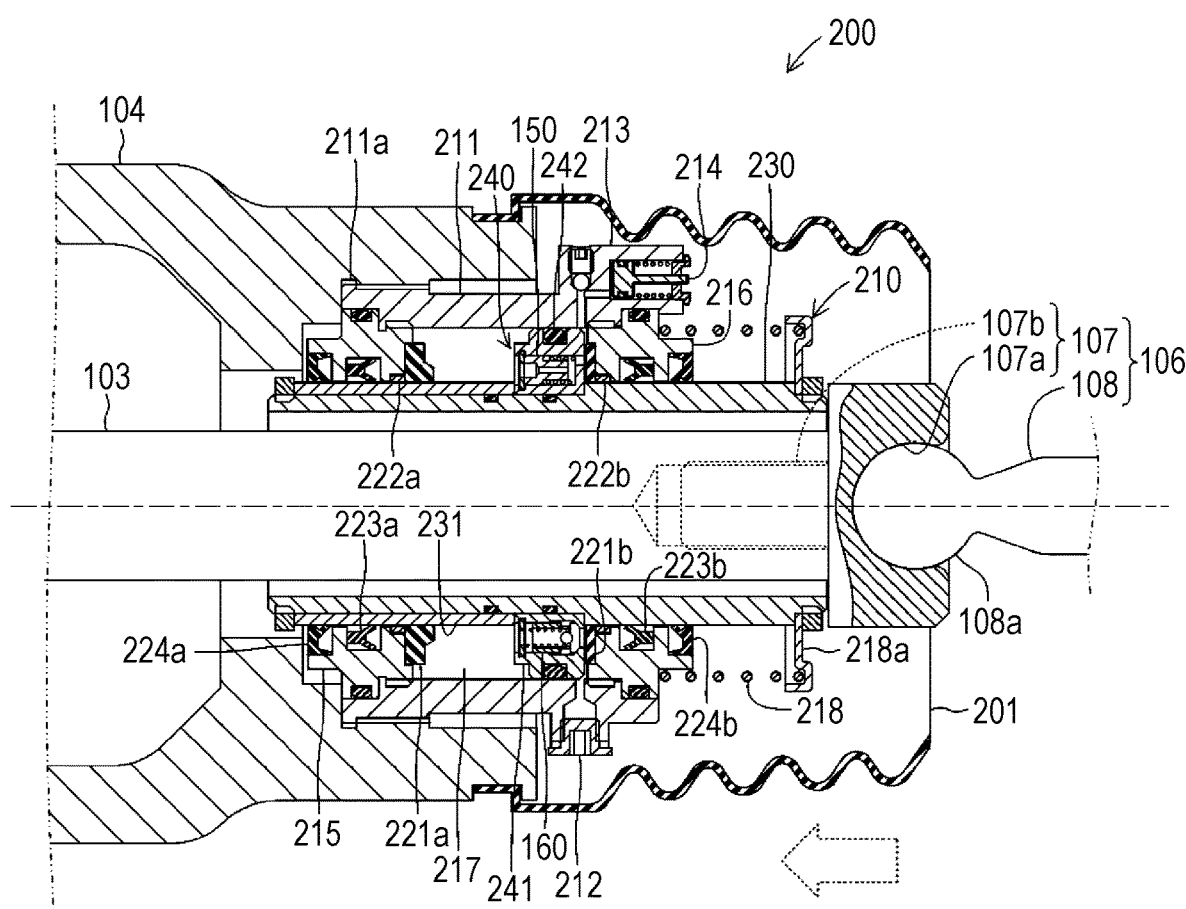
FIG. 11 is a sectional view showing the state of the linear-motion damper shown in FIG. 9 at a moment when a socket main body has contacted a relative displacement body.

Next, as shown in FIG. 11, in a case where the rack bar 103 has reached the vicinity of the displacement limit, such as a case where the wheel 112 of the self-propelled vehicle has been steered to the vicinity of the steering limit, the socket main body 107 contacts the end portion of the relative displacement body 230, and the linear-motion damper 210 is activated.

Figure 12:
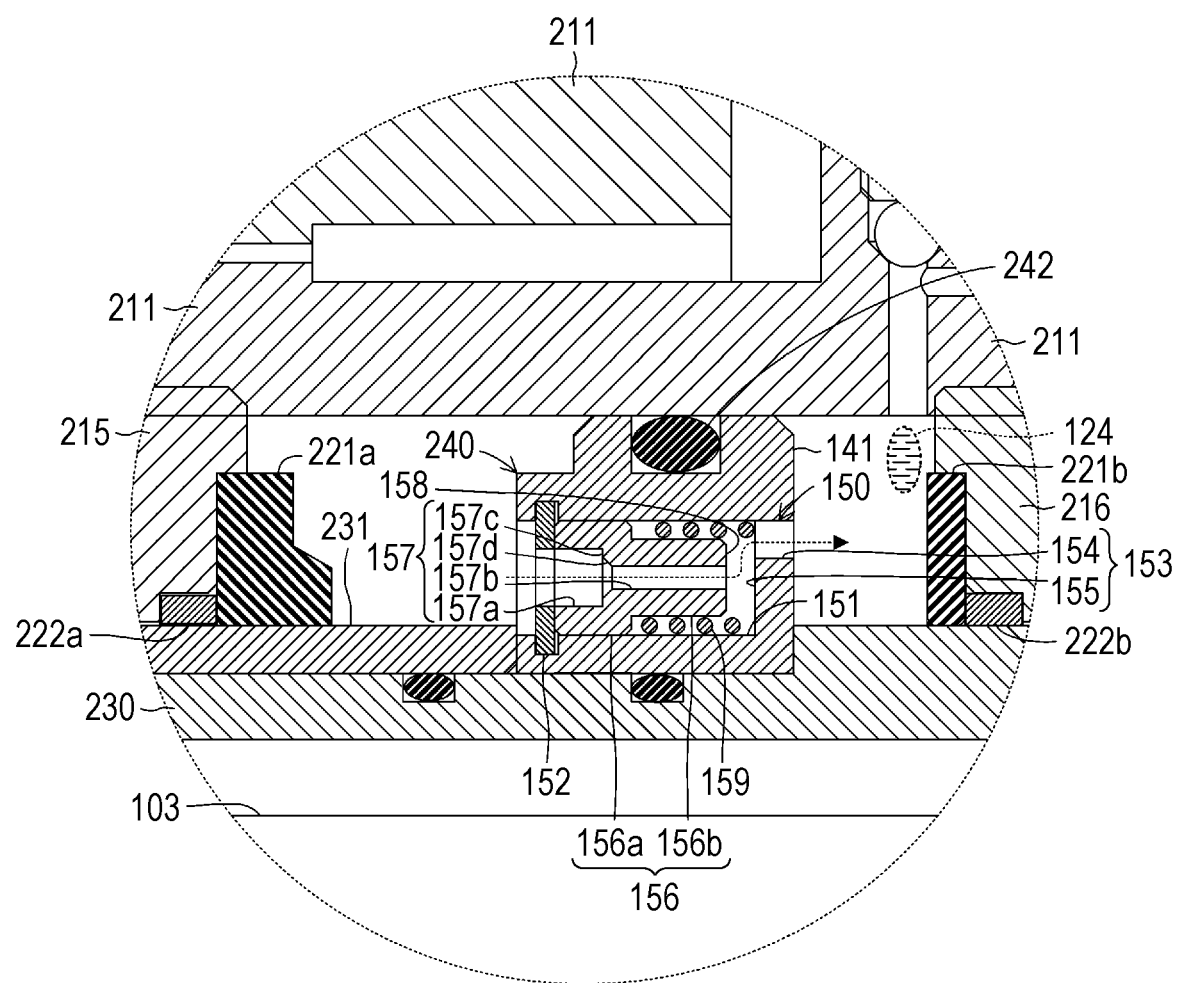
FIG. 12 is a partially-enlarged view of a portion, which is indicated by a dashed circle 12, of the linear-motion damper shown in FIG. 9 in a state in which a first flow control valve causes fluid to flow.

First, in a case where the socket main body 107 has contacted the end portion of the relative displacement body 230 with weak force (low speed), the relative displacement body 230 slowly slidably displaces to a rack housing 104 side relative to the inner chamber forming body 211, as shown in FIG. 12. That is, the flow control valve 240 displaces to the buffer 221a side (the left side as viewed in the figure) against the elastic force of the return elastic body 218 in the inner chamber 217. In this case, in the first flow control valve 150, the fluid 124 flows in from a large-diameter hole 157a side of a second flow hole 157 of the second flow body 156, and flows toward a small-diameter hole 157b side.

However, in this case, since the flow control valve 240 slowly displaces in the inner chamber 217, a force of pressing the second flow body 156 is smaller than elastic force of a separation elastic body 159. Thus, the second flow body 156 is not pressed against the first flow body 153 after having displaced to a first flow body 153 side. Consequently, in the first flow control valve 150, the fluid 124 on the front side in the displacement direction flows, with slight flow resistance, to the rear side in the displacement direction through each of the second flow hole 157 of the second flow body 156 and a first flow hole 154 of the first flow body 153.

Since the second flow control valve 160 is a one-way valve blocking the flow of the fluid 124 from the front side to the rear side in the displacement direction of the flow control valve 240 when the relative displacement body 230 slidably displaces against the elastic force of the return elastic body 218, the fluid 124 does not flow. Since the third flow control valve 170 is a valve allowing the fluid 124 to flow in both directions, i.e., the front side and the rear side, in the displacement direction of the flow control valve 240, the fluid 124 flows, with slight flow resistance, from the front side to the rear side in the displacement direction of the flow control valve 240.

Thus, the flow control valve 240 displaces to the buffer 123a side while generating ignorable extremely-small damping force. Accordingly, the relative displacement body 230 slowly slidably displaces to the rack housing 104 side.

Thereafter, in a case where the rack bar 103 has displaced to a knuckle arm 111 side such that the socket main body 107 is separated from the end portion of the relative displacement body 230, the relative displacement body 230 displaces to an original position by the elastic force of the return elastic body 218 (see FIG. 9), as in the first embodiment. That is, the flow control valve 240 displaces to a buffer 221b side while generating ignorable extremely-small damping force. Accordingly, the relative displacement body 230 slidably displaces to the socket main body 107 side faster than the above-described displacement speed.

Figure 13:
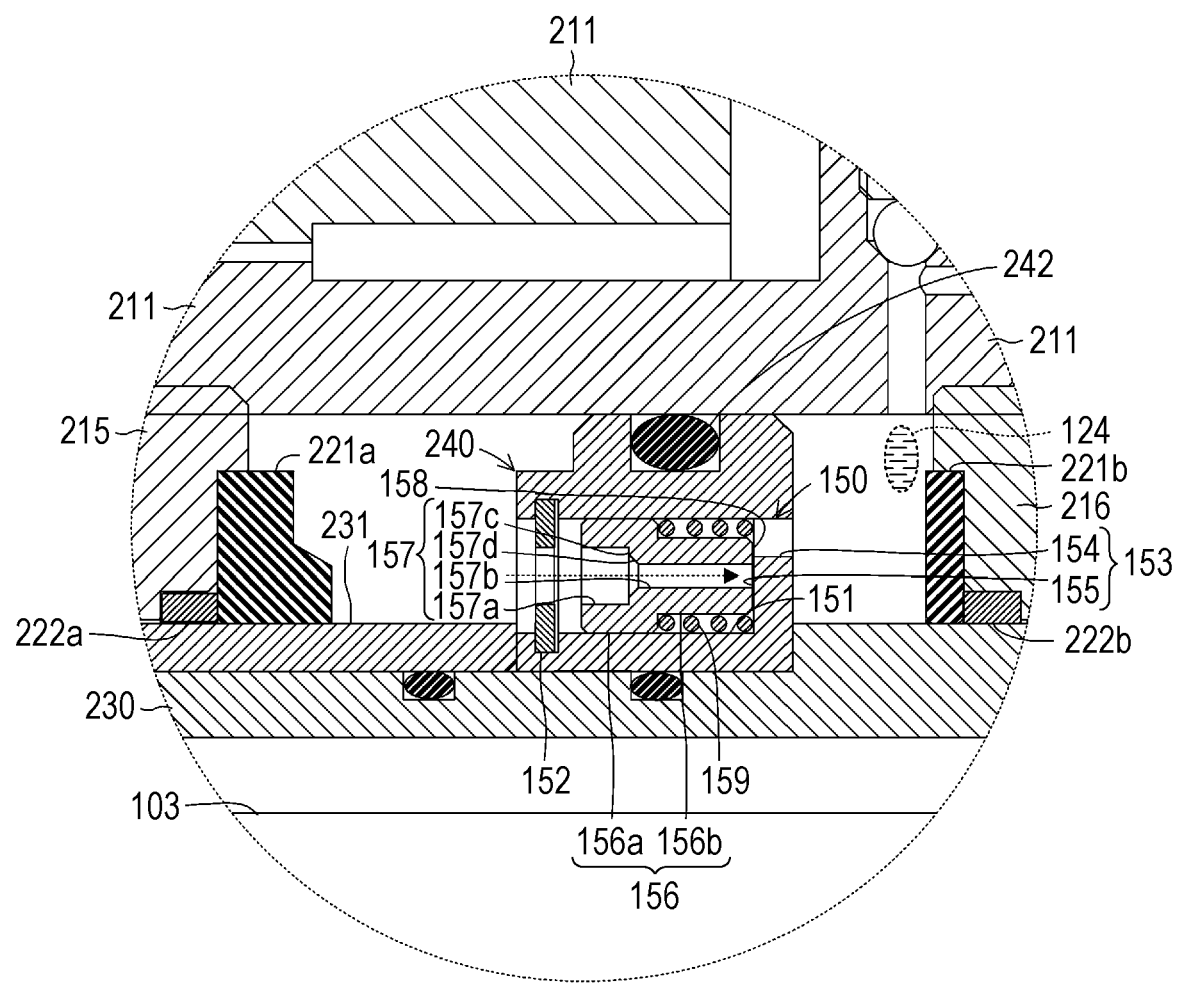
FIG. 13 is a partially-enlarged view showing the state of the linear-motion damper shown in FIG. 9 when the first flow control valve does not cause the fluid to flow.

Next, in a case where the socket main body 107 has contacted the end portion of the relative displacement body 230 with strong force (high speed), the relative displacement body 230 rapidly slidably displaces to the rack housing 104 side relative to the inner chamber forming body 211, as shown in FIG. 13. That is, the flow control valve 240 rapidly displaces to the buffer 221a side against the elastic force of the return elastic body 218 in the inner chamber 217.

In this case, in the first flow control valve 150, a force of pressing the second flow body 156 by the fluid 124 is greater than the elastic force of the separation elastic body 159, and therefore, the second flow body 156 displaces to the first flow body 153 side and is pressed against the first flow body 153. In this case, since a first hole diameter restriction portion 155 and a second hole diameter restriction portion 158 are each formed at positions facing the second flow hole 157 and the first flow hole 154, the first hole diameter restriction portion 155 and the second hole diameter restriction portion 158 close the entirety of the second flow hole 157 and part of the first flow hole 154. Thus, in the first flow control valve 150, the fluid 124 does not flow (see a dashed arrow) upon displacement of the flow control valve 240 to the rack housing 104 side. Further, in this case, the fluid 124 does not flow in the second flow control valve 160 as in the above-described case.

Since the fluid 124 can flow only in the third flow control valve 170 in the flow control valve 240, extremely-great flow resistance is generated at the third flow control valve 170. Thus, the flow control valve 240 displaces to the buffer 221a side against the extremely-great flow resistance by the third flow control valve 170. Accordingly, the relative displacement body 230 slidably displaces to the rack housing 104 side while generating extremely-great damping force. That is, the linear-motion damper 210 can damp strong impact generated on the rack bar 103.

Thereafter, in a case where the rack bar 103 has displaced to the knuckle arm 111 side such that the socket main body 107 is separated from the end portion of the relative displacement body 230, the relative displacement body 230 displaces, as in the above-described case, to the original position by the elastic force of the return elastic body 218 (see FIG. 9). That is, the flow control valve 240 displaces to the buffer 221b side while generating ignorable extremely-small damping force, and therefore, the relative displacement body 230 quickly slidably displaces to the socket main body 107 side.

Implementation of the present invention is not limited to each of the above-described embodiments, and various changes can be made without departing from the object of the present invention. Note that in description of each variation, the same reference numerals are used to represent elements similar to those of the above-described embodiments and overlapping description thereof will be omitted.

For example, in each of the above-described embodiments, the linear-motion damper 120, 210 is configured such that the flow control valve 140, 240 is provided in the inner chamber 121, 217. With this configuration, the flow control valve 140, 240 is provided in the inner chamber 121, 217 so that the device configuration of the linear-motion damper 120, 210 can be decreased in size. However, the linear-motion damper 120, 210 may be configured such that part or the entirety of the flow control valve 140, 240 is provided outside the inner chamber 121, 217.

Figure 14:
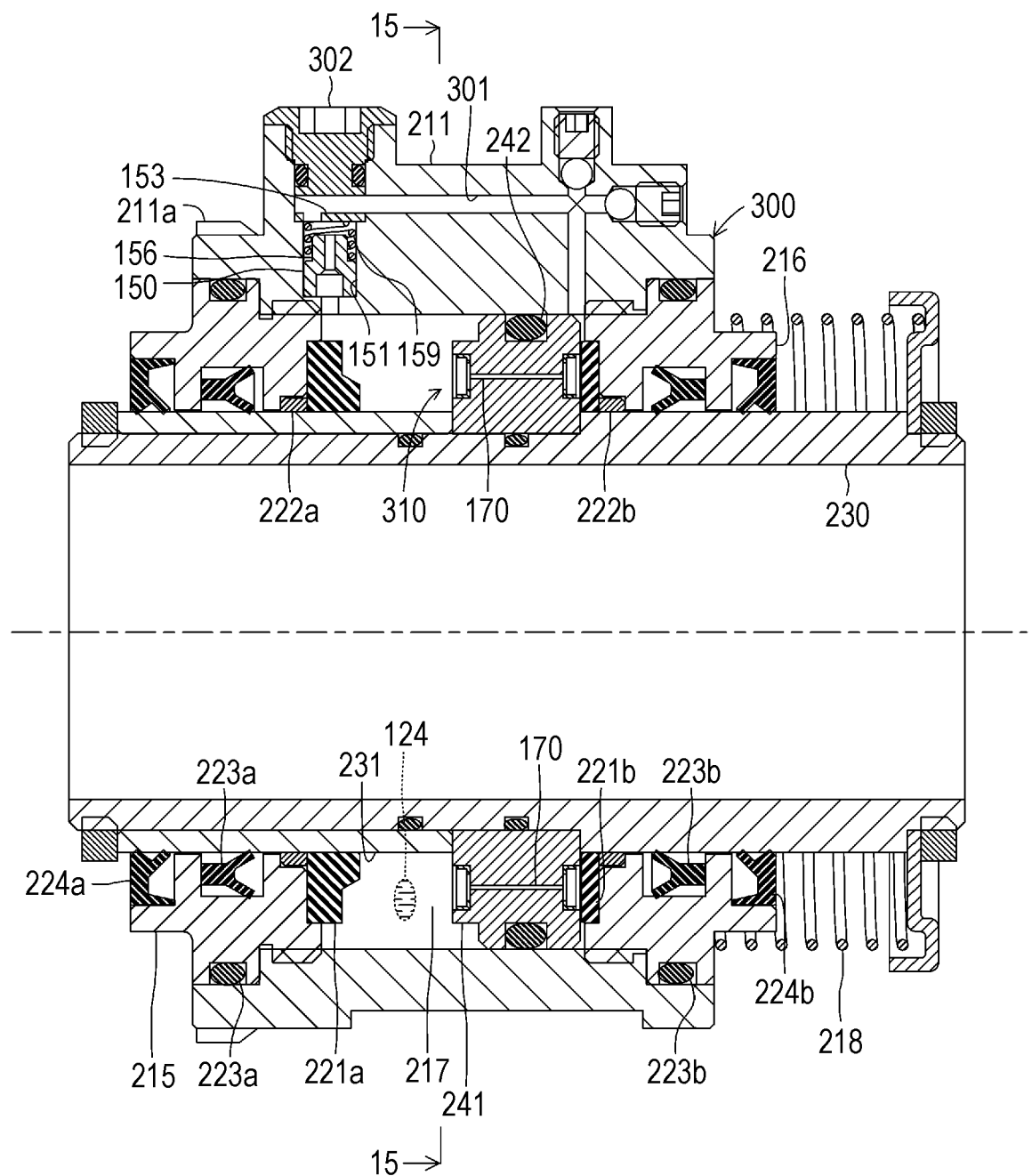
FIG. 14 is a sectional view showing the outline of an internal configuration of a linear-motion damper according to a variation of the present invention.
Figure 15:
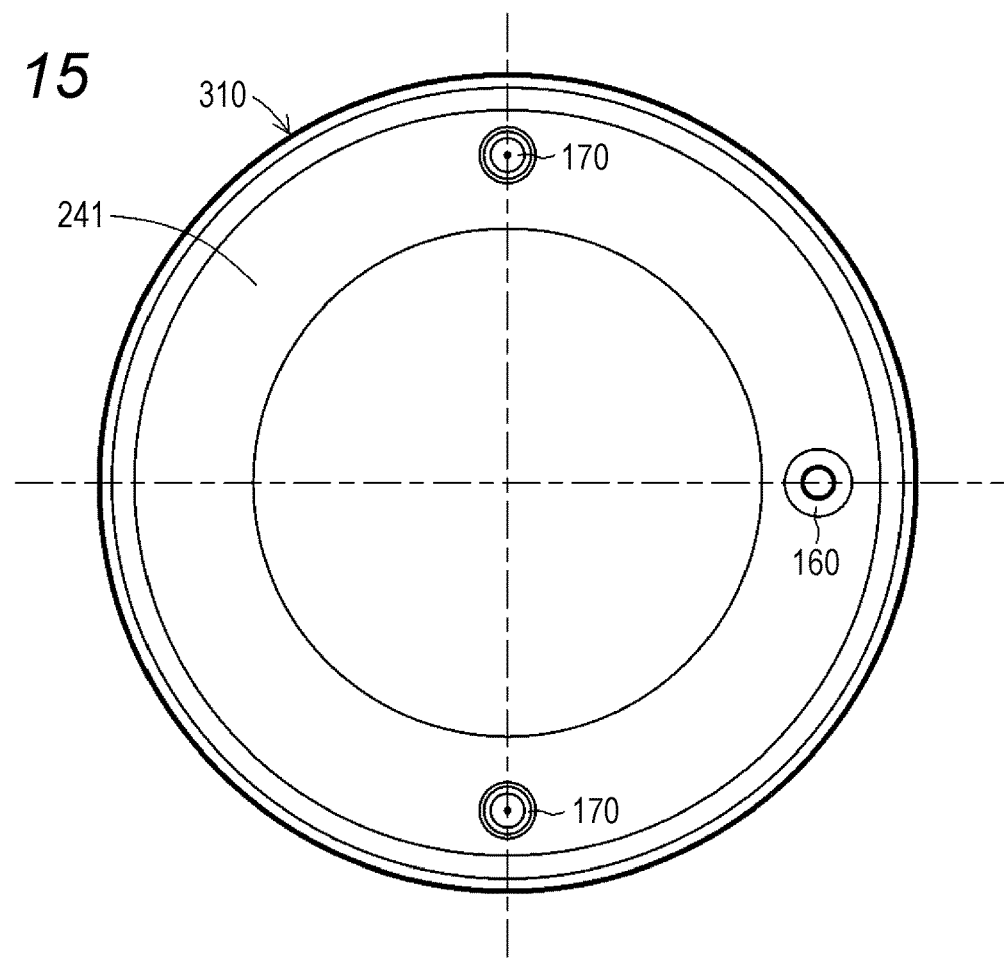
FIG. 15 is a front view of only a flow control valve along a 15-15 line shown in FIG. 14.

For example, FIGS. 14 and 15 show a linear-motion damper 300 which is the linear-motion damper 210 according to the second embodiment, in which the inner chamber forming body 211 includes the first flow control valve 150. In the linear-motion damper 300, a bypass flow path 301 is formed inside the inner chamber forming body 211. Further, the linear-motion damper 300 includes, at the outer peripheral portion of the inner chamber forming body 211, the first flow control valve 150 forming part of a flow control valve 310 with connected to the bypass flow path 301. The bypass flow path 301 is a flow path of the fluid 124, and causes one end side and the other end side with respect to the flow control valve 310 in the axis direction in the inner chamber 217 to communicate with each other.

The flow control valve 310 is the flow control valve 240 according to the second embodiment, in which only the first flow control valve 150 is relocated in the inner chamber forming body 211 and which includes each of the second flow control valve 160 and the third flow control valves 170. The first flow control valve 150 controls the flow of the fluid 124 in the bypass flow path 301.

In this case, in the first flow control valve 150, the second flow body housing portion 151 is formed with communicating with the inner chamber 217 in the inner chamber forming body 211. Further, in the second flow body housing portion 151, each of the second flow body 156 and the separation elastic body 159 is housed. On the side opposite to an inner chamber 217 side in the second flow body housing portion 151, an eccentric ring body (a component formed with a through-hole functioning as the first flow hole 154 at a position eccentric with respect to the center of a discoid body functioning as the first hole diameter restriction portion 155) forming the first flow body 153 is fitted. The side opposite to the inner chamber 217 side in the second flow body housing portion 151 communicates with the bypass flow path 301 through the first flow body 153. At a portion of the inner chamber forming body 211 facing the second flow body housing portion 151 through the bypass flow path 301, the bypass flow path 301 extending so as to communicate with the outside of the inner chamber forming body 211 is formed. The extending bypass flow path 301 is closed with a plug 302.

That is, the linear-motion damper 300 is configured such that the second flow control valve 160 and the third flow control valves 170 as part of the flow control valve 310 are provided in the inner chamber 217 and the first flow control valve 150 as the remaining part of the flow control valve 310 is provided outside the inner chamber 217. The linear-motion damper 300 configured as described above is activated in a manner similar to the linear-motion damper 210 in the second embodiment. Note that each of the rack bar 103 and the rack housing 104 is not shown in FIG. 14.

As described above, part or the entirety of the flow control valve 310 is provided at least outside the inner chamber 217 in the linear-motion damper 300 so that a great capacity of the inner chamber 217 can be ensured. Moreover, in the linear-motion damper 300, the first flow control valve 150 can be exposed by detachment of the plug 302 from the inner chamber forming body 211 so that maintenance can be improved.

In each of the above-described embodiments, the linear-motion damper 120, 210, 300 includes the return elastic body 132, 218. However, the linear-motion damper 120, 210, 300 may be formed without the return elastic body 132, 218 in a case where the flow control valve 140, 240, 310 does not need to be constantly pressed to one side (the external force acting side with respect to the linear-motion damper 120, 210, 300) in the inner chamber 121, 217.

Figure 16:
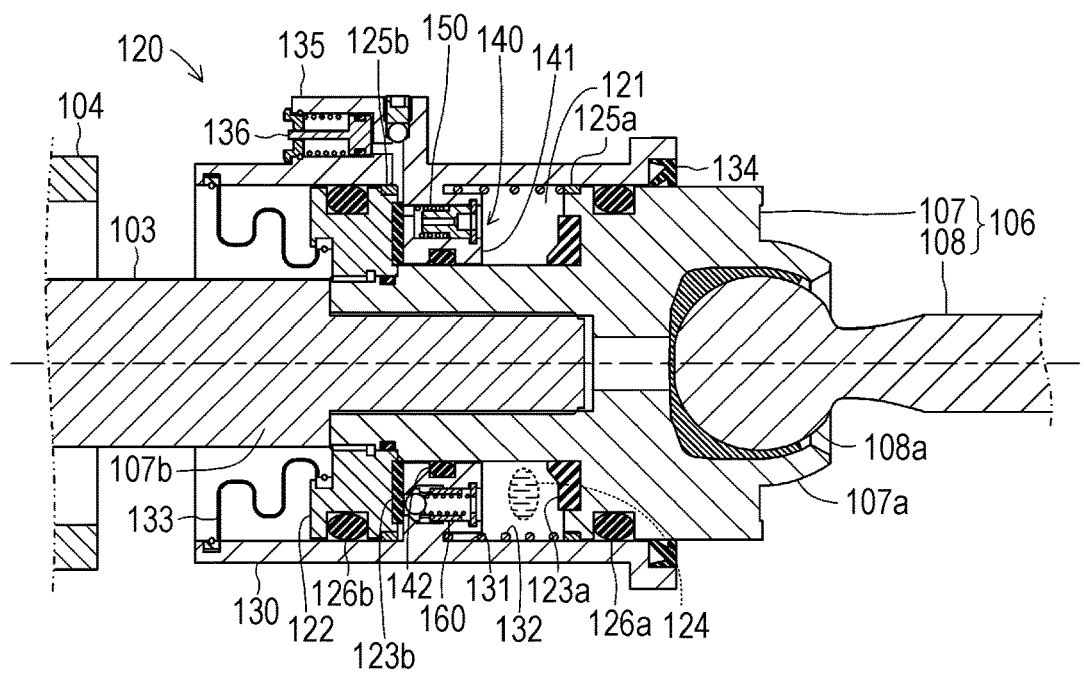
FIG. 16 is a sectional view showing the outline of an internal configuration of a linear-motion damper according to another variation of the present invention.

In the first embodiment, the socket main body 107 as the relative displacement body is formed in the shaft shape. However, the socket main body 107 as the relative displacement body may be formed in a tubular shape as shown in FIG. 16. In this case, in the steering device 100, an external thread is formed at the tip end portion of the rack bar 103, and an internal thread is formed in a through-hole of the socket main body 107. With this configuration, the rack bar 103 and the socket main body 107 can be coupled to each other by screw fitting.

Further, in each of the above-described embodiments, the first flow control valve 150 is configured such that the second hole diameter restriction portion 158 of the second flow body 156 closes part of the first flow hole 154 of the first flow body 153 and the first hole diameter restriction portion 155 of the first flow body 153 closes the entirety of the second flow hole 157 of the second flow body 156. However, the first flow control valve 150 may only be required to be configured such that at least part of at least one of the first flow hole 154 or the second flow hole 157 is closed.

Figure 17:
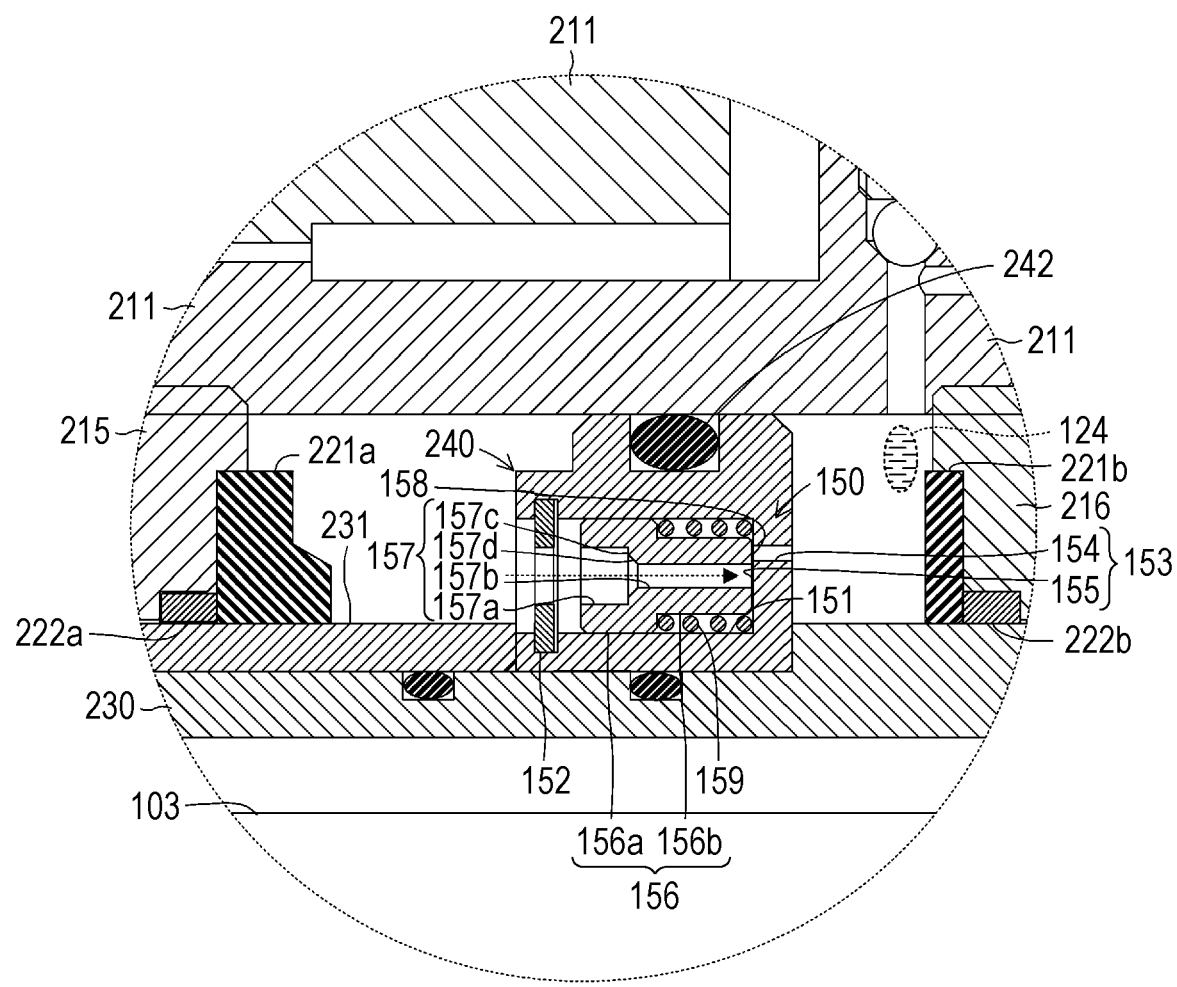
FIG. 17 is a partially-enlarged view showing the state of a linear-motion damper according to a variation of the present invention when both a first flow hole and a second flow hole are fully closed such that a first flow control valve does not cause fluid to flow.
Figure 18:
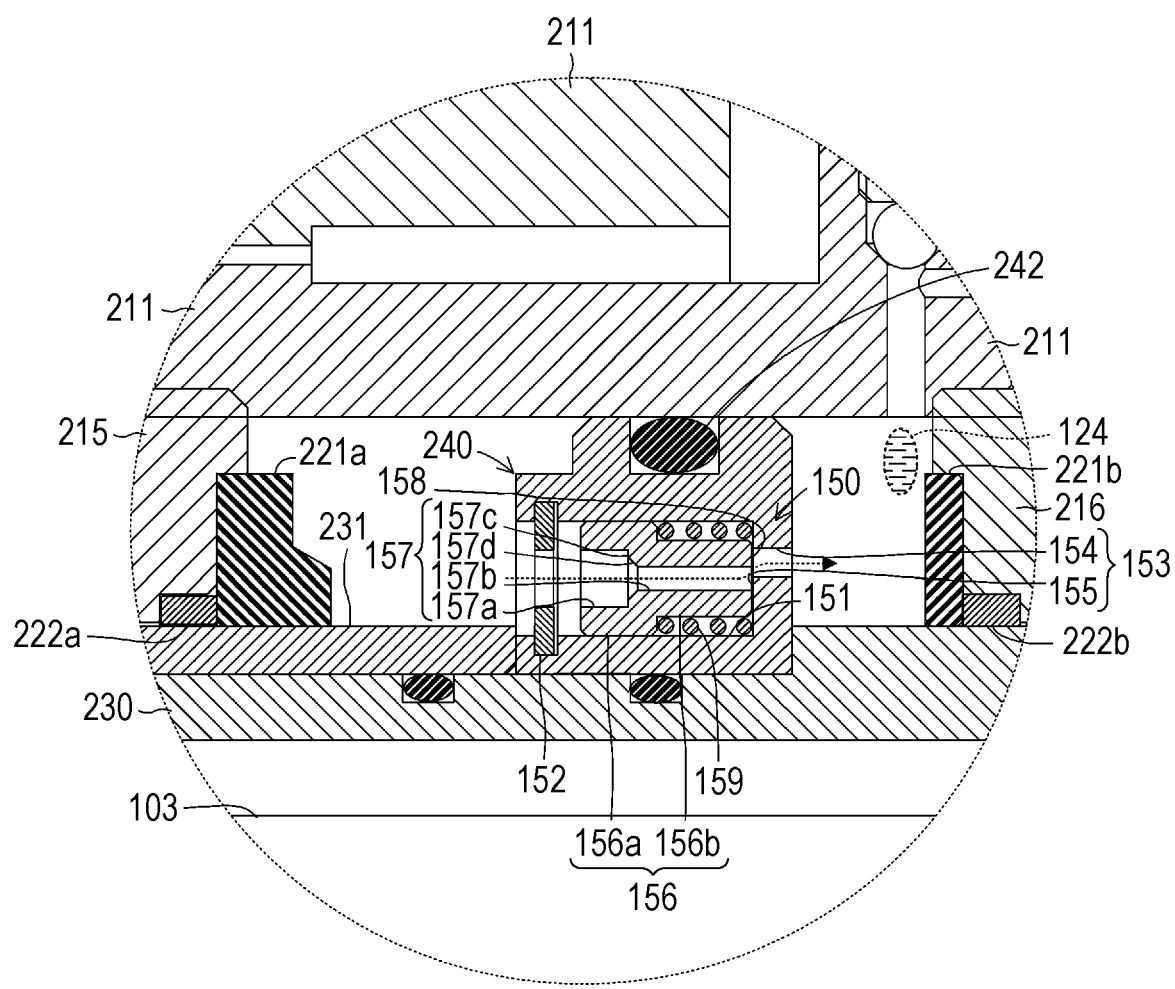
FIG. 18 is a partially-enlarged view showing the state of a linear-motion damper according to another variation of the present invention when part of a first flow hole and part of a second flow hole overlap with each other such that the flow of fluid is ensured.

Thus, the first flow control valve 150 may be, for example, configured such that both the first flow hole 154 and the second flow hole 157 are fully closed, as shown in FIG. 17. Alternatively, the first flow control valve 150 may be configured such that part of each of the first flow hole 154 and the second flow hole 157 is closed. In this case, the first flow control valve 150 may be, for example, configured such that part of the first flow hole 154 and part of the second flow hole 157 overlap with each other to ensure the flow of the fluid 124 when the second flow body 156 closely contacts the first flow body 153, as shown in FIG. 18. According to this configuration, the flow control valve 140, 240 may be formed without the third flow control valve 170.

Figure 19:
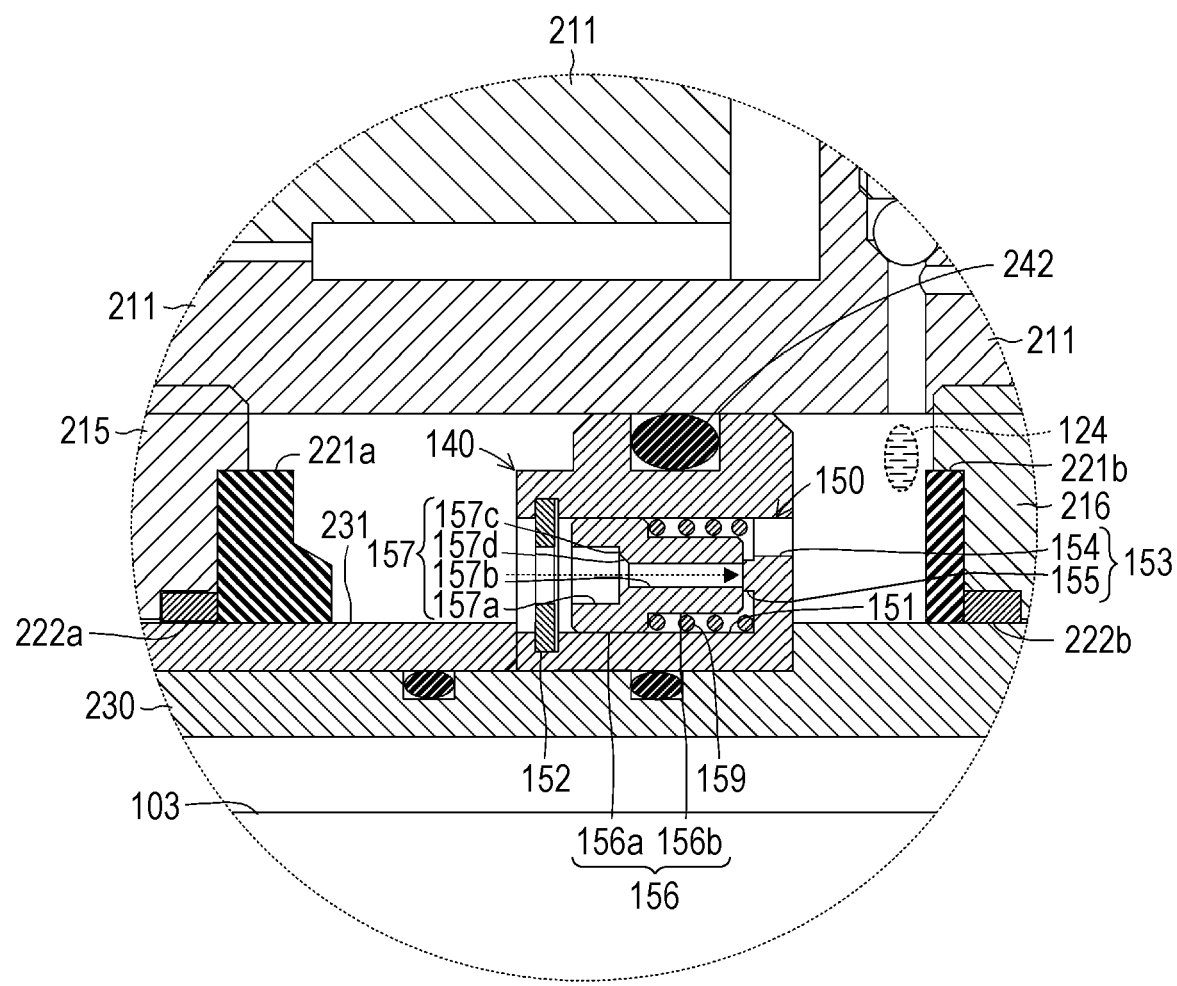
FIG. 19 is a partially-enlarged view showing the state of a linear-motion damper of still another variation of the present invention when only a second flow hole is fully closed such that a first flow control valve does not cause fluid to flow.

The first flow control valve 150 may be configured such that one of the first flow hole 154 or the second flow hole 157 is fully closed and the other one of the first flow hole 154 or the second flow hole 157 is not closed at all. For example, as shown in FIG. 19, in the first flow control valve 150, the first hole diameter restriction portion 155 protruding in a columnar shape to the small-diameter hole 157b (the second flow hole 157) side may be formed at a portion of the bottom portion of the second flow body housing portion 151 facing the small-diameter hole 157b. In this case, the second hole diameter restriction portion 158 of the second flow body 156 is omitted. According to this configuration, in the first flow control valve 150, only the second flow hole 157 can be closed by contact of the second flow body 156 with the first hole diameter restriction portion 155.

Figure 20:
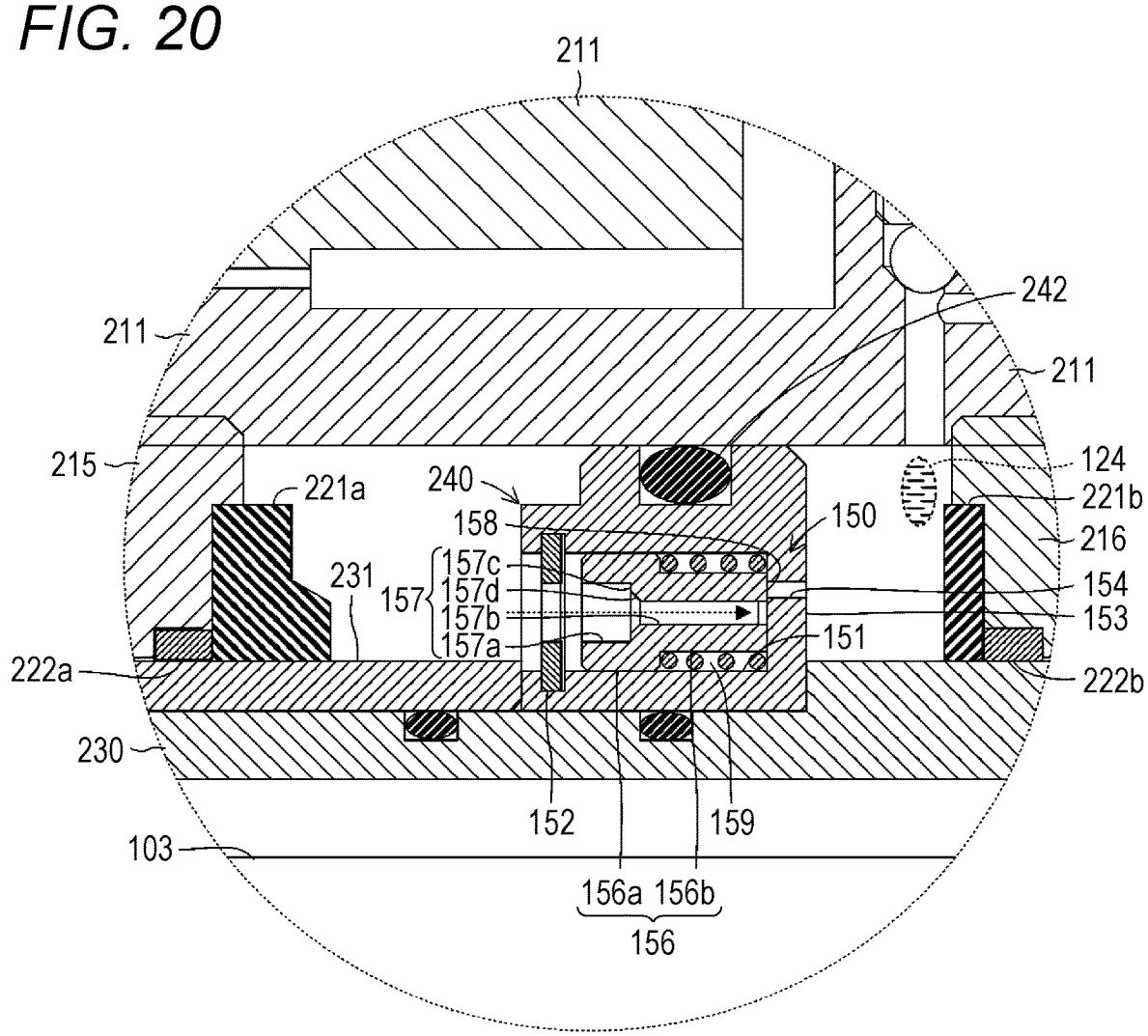
FIG. 20 is a partially-enlarged view showing the state of a linear-motion damper according to still another variation of the present invention when only a first flow hole is fully closed such that a first flow control valve does not cause fluid to flow.
Figure 21:
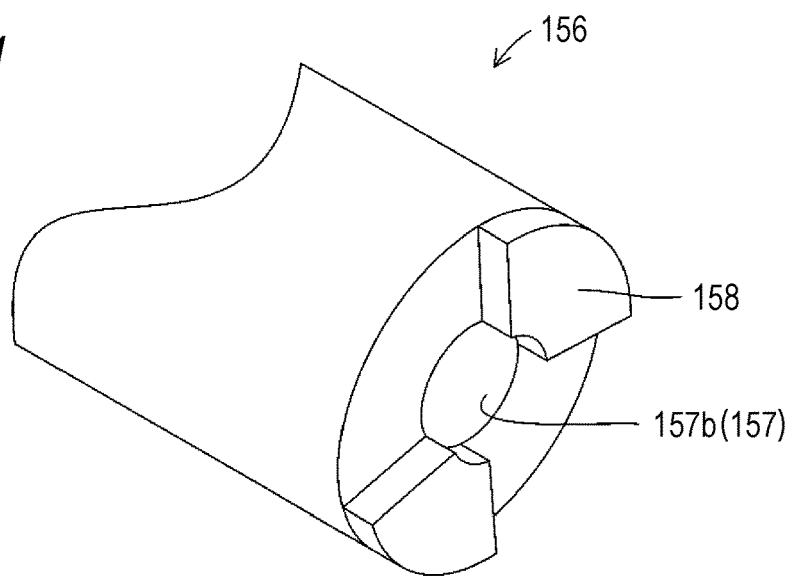
FIG. 21 is a partially-enlarged perspective view showing an external configuration of a tip end portion of a second flow body shown in FIG. 20.

For example, as shown in each of FIGS. 20 and 21, in the first flow control valve 150, the second hole diameter restriction portion 158 protruding in a columnar shape toward a first flow hole 154 side is provided at a portion of the second flow body 156 facing the first flow hole 154 so that only the first flow hole 154 can be closed. In this case, the first hole diameter restriction portion 155 of the first flow body 153 is omitted. In these cases, the columnar first hole diameter restriction portion 155 and/or the columnar second hole diameter restriction portion 158 may be inserted into the small-diameter hole 157b (the second flow hole 157) and/or the first flow hole 154 to close each hole.

In each of the above-described embodiments, the second flow hole 157 includes two holes, i.e., the large-diameter hole 157a and the small-diameter hole 157b. However, the second flow hole 157 may include one of the large-diameter hole 157a or the small-diameter hole 157b, or may include three or more holes having different inner diameters. At the second flow hole 157, the tapered portion 157d is formed at an opening of the small-diameter hole 157b on the side opposite to the first flow body 153. With this configuration, in the second flow body 156, the fluid 124 can easily flow into the second flow hole 157, and activation of the first flow control valve 150 can be easily stabilized. In the first flow control valve 150, the fluid 124 easily flows into the second flow hole 157 so that a flow speed can be increased. Thus, the tapered portion 157d receives strong pressing force from the fluid 124, and accordingly, the second flow body 156 can easily displace to the first flow body 153 side. However, the second flow hole 157 is not necessarily formed in the tapered shape, but may be formed in a straight shape, needless to say. Note that the first flow hole 154 may include multiple different holes or have a tapered shape at an opening.

In each of the above-described embodiments, the flow control valve 140, 240, 310 includes the multiple flow control valves such as the first flow control valve 150, the second flow control valve 160, and the third flow control valve 170. The second flow control valve 160 described herein can improve the displacement speed of the flow control valve 140, 240 upon return displacement. The third flow control valve 170 can ensure the flow of the fluid 124 in a state in which the second flow body 156 closely contacts the first flow body 153 and the flow of the fluid 124 is fully blocked.

However, the flow control valve 140, 240, 310 may include at least one of the first flow control valve 150 or the third flow control valve 170 according to the specifications of the linear-motion damper 120, 210, 300. In this case, the second flow control valve 160 may or may not be provided according to the specifications of the linear-motion damper 120, 210, 300.

In each of the above-described embodiments, the linear-motion damper 120, 210, 310 is applied to the steering device 100, 200. However, the linear-motion damper 120, 210, 300 may be, upon use thereof, attached to a device or a tool other than the steering device 100, 200, such as a suspension mechanism, a seat tilting mechanism, a door opening/closing mechanism, a mechanical device other than the self-propelled vehicle, an electrical device, a tool, or furniture.

LIST OF REFERENCE SIGNS

100 Steering Device
101 Steering Wheel
102 Steering Shaft
102a Pinion Gear
103 Rack Bar
103a Rack Gear
104 Rack Housing
105 Intermediate Coupling Body
106 Rack End
107 Socket Main Body (Relative Displacement Body)
107a Ball Holding Portion
107b External Thread Portion
108 Stud Body
108a Ball Portion
110 Tie Rod
111 Knuckle Arm
112 Wheel
120 Linear-Motion Damper
121 Inner Chamber
122 Wall Forming Body
123a, 123b Buffer
124 Fluid
125a, 125b Sliding Bush
126a, 126b Seal Ring
130 Inner Chamber Forming Body
131 Elastic Body Holding Portion
132 Return Elastic Body
133 Dust Boot
134 Dust Seal
135 Accumulator Housing Portion
136 Accumulator
140 Flow Control Valve
141 Valve Support
142 Seal Ring
150 First Flow Control Valve
151 Second Flow Body Housing Portion
152 Retaining Ring
153 First Flow Body
154 First Flow Hole
155 First Hole Diameter Restriction Portion
156 Second Flow Body
156a Large-Diameter Portion
156b Small-Diameter Portion
157 Second Flow Hole
157a Large-Diameter Hole
157b Small-Diameter Hole
157c Step Portion
157d Tapered Portion
158 Second Hole Diameter Restriction Portion
159 Separation Elastic Body
160 Second Flow Control Valve
170 Third Flow Control Valve
200 Steering Device
201 Dust Boot
210 Linear-Motion Damper
211 Inner Chamber Forming Body
211a External Thread Portion
212 Oil Supply Port
213 Accumulator Housing Portion
214 Accumulator 215, 216 Wall Forming Body
217 Inner Chamber
218 Return Elastic Body
218a Backing Plate
221a, 221b Buffer
222a, 222b Sliding Bush
223a, 223b Seal Ring
224a, 224b Dust Seal
230 Relative Displacement Body
231 Fixing Sleeve
240 Flow Control Valve
241 Valve Support
242 Seal Ring
300 Linear-Motion Damper
301 Bypass Flow Path
302 Plug
310 Flow Control Valve

What is claimed is:

1. A linear-motion damper including an inner chamber forming body having an inner chamber in which fluid is housed in a liquid-tight manner and damping external force received by the fluid by limiting a flow of the fluid, comprising:
   a relative displacement body that displaces relative to the inner chamber forming body; and
   a flow control valve provided at least at one of the inner chamber forming body or the relative displacement body to cause the fluid to flow with a limitation on the flow of the fluid,
   wherein the inner chamber forming body is formed in a tubular shape, and the inner chamber is formed inside a tubular portion of the inner chamber forming body, and
   the relative displacement body penetrates the inner chamber forming body, and is slidably fitted in the inner chamber forming body, and
   the linear-motion damper is provided not on an axis direction of a portion of an attachment target of the linear-motion damper, but outside the portion.

2. The linear-motion damper according to claim 1, further comprising:
   a return elastic body that provides elastic force at least to one of the inner chamber forming body or the relative displacement body such that the flow control valve is arranged on an external force acting side with respect to the linear-motion damper.

3. The linear-motion damper according to claim 1, wherein
   the relative displacement body is formed in a tubular shape.

4. The linear-motion damper according to claim 1, wherein
   the flow control valve is provided at least at the inner chamber forming body.

5. The linear-motion damper according to claim 1, wherein
   the flow control valve is provided at least at the relative displacement body.

6. The linear-motion damper according to claim 1, wherein
   the flow control valve is provided at least outside the inner chamber.

7. A steering device including:
   a steering shaft formed so as to extend in a bar shape and rotated by operation of a steering wheel,
   a rack bar formed so as to extend in a rod shape and converting rotary motion of the steering shaft into reciprocating motion in an axis direction to transmit the reciprocating motion,
   an intermediate coupling body coupled to each end portion of the rack bar to directly or indirectly couple a wheel targeted for steering to the each end portion,
   a rack housing covering the rack bar, and
   a linear-motion damper provided between the rack housing and the rack bar or the intermediate coupling body to absorb impact from the wheel, the linear-motion damper including an inner chamber forming body having an inner chamber in which fluid is housed in a liquid-tight manner and damping external force received by the fluid by limiting a flow of the fluid, wherein
   the linear-motion damper includes:
      a relative displacement body that displaces relative to the inner chamber forming body; and
      a flow control valve provided at least at one of the inner chamber forming body or the relative displacement body to cause the fluid to flow with a limitation on the flow of the fluid,
   the inner chamber forming body is formed in a tubular shape, and the inner chamber is formed inside a tubular portion of the inner chamber forming body,
   the relative displacement body penetrates the inner chamber forming body, and is slidably fitted in the inner chamber forming body,
   the relative displacement body is formed at the intermediate coupling body, and
   the inner chamber forming body is formed at such a position that the inner chamber forming body contacts or separates from the rack housing by the reciprocating motion of the rack bar.

8. A steering device including:
   a steering shaft formed so as to extend in a bar shape and rotated by operation of a steering wheel,
   a rack bar formed so as to extend in a rod shape and converting rotary motion of the steering shaft into reciprocating motion in an axis direction to transmit the reciprocating motion,
   an intermediate coupling body coupled to each end portion of the rack bar to directly or indirectly couple a wheel targeted for steering to the each end portion,
   a rack housing covering the rack bar, and
   a linear-motion damper provided between the rack housing and the rack bar or the intermediate coupling body to absorb impact from the wheel, the linear-motion damper including an inner chamber forming body having an inner chamber in which fluid is housed in a liquid-tight manner and damping external force received by the fluid by limiting a flow of the fluid, wherein
   the linear-motion damper includes:
      a relative displacement body that displaces relative to the inner chamber forming body; and
      a flow control valve provided at least at one of the inner chamber forming body or the relative displacement body to cause the fluid to flow with a limitation on the flow of the fluid,
   the inner chamber forming body is formed in a tubular shape, and the inner chamber is formed inside a tubular portion of the inner chamber forming body,
   the relative displacement body penetrates the inner chamber forming body, and is slidably fitted in the inner chamber forming body, the inner chamber forming body is formed at an end portion of the rack housing, and the rack bar or the intermediate coupling body penetrates the relative displacement body, and the relative displacement body is formed at such a position that the rack bar or the intermediate coupling body contacts or separates from the relative displacement body by the reciprocating motion of the rack bar.

9. The linear-motion damper according to claim 1, wherein the inner chamber forming body includes a ring-shaped valve support that supports the flow control valve, and the ring-shaped valve support projects inward from an inner peripheral portion of the inner chamber forming body toward an outer peripheral portion of the relative displacement body, and is slidably fitted to the relative displacement body.

\* \* \* \* \*

UNITED STATES PATENT AND TRADEMARK OFFICE
CERTIFICATE OF CORRECTION

| | | |
|---|---|---|
| PATENT NO. | : 12,145,677 B2 | Page 1 of 1 |
| APPLICATION NO. | : 17/998817 | |
| DATED | : November 19, 2024 | |
| INVENTOR(S) | : Kazumasa Nakaya et al. | |

It is certified that error appears in the above-identified patent and that said Letters Patent is hereby corrected as shown below:

In the Specification

Column 3, Line 56, delete "that the tie rod or the intermediate" and insert --that the intermediate--.

Signed and Sealed this
Tenth Day of June, 2025

Coke Morgan Stewart
*Acting Director of the United States Patent and Trademark Office*